(12) United States Patent
Binder

(10) Patent No.: US 8,763,450 B2
(45) Date of Patent: Jul. 1, 2014

(54) LOCKING FASTENING DEVICE, ADJUSTABLE FASTENING DEVICE, COMPONENT SYSTEM, MAIN WING OF A WIND TUNNEL MODEL AIRCRAFT, AND WIND TUNNEL MODEL AIRCRAFT HAVING SUCH A MAIN WING

(75) Inventor: Michael Binder, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 192 days.

(21) Appl. No.: 13/309,905

(22) Filed: Dec. 2, 2011

(65) Prior Publication Data

US 2012/0138747 A1 Jun. 7, 2012

Related U.S. Application Data

(60) Provisional application No. 61/418,988, filed on Dec. 2, 2010.

(51) Int. Cl.
*G01M 9/00* (2006.01)
*B64C 1/06* (2006.01)

(52) U.S. Cl.
USPC .............................. 73/147; 244/131; 244/224

(58) Field of Classification Search
USPC .......................................................... 73/147
See application file for complete search history.

(56) References Cited

U.S. PATENT DOCUMENTS

| | | | |
|---|---|---|---|
| 5,345,818 A * | 9/1994 | Magill et al. | 73/147 |
| 6,615,652 B1 * | 9/2003 | Bechstein et al. | 73/147 |
| 6,712,544 B2 | 3/2004 | Kruger et al. | |
| 6,776,566 B2 | 8/2004 | Kobusch et al. | |
| 7,037,027 B2 | 5/2006 | Steinbeck | |
| 7,086,896 B2 | 8/2006 | Edwards et al. | |
| 7,241,097 B2 | 7/2007 | Dembowsky et al. | |
| 7,455,471 B2 | 11/2008 | Gawehn | |
| 7,997,539 B2 * | 8/2011 | Thanhofer et al. | 244/224 |
| 8,245,977 B2 * | 8/2012 | Binder | 244/131 |

FOREIGN PATENT DOCUMENTS

| | | |
|---|---|---|
| DE | 90905 A5 | 6/1971 |
| DE | 295 11 204 | 11/1996 |
| DE | 198 16 053 A1 | 10/1998 |
| DE | 100 04 697 A1 | 8/2001 |
| DE | 20 2004 002 474 U1 | 4/2004 |
| DE | 20 2004 019 153 U1 | 2/2005 |
| DE | 103 53 376 B4 | 9/2005 |
| DE | 10 2006 025 036 | 4/2008 |
| DE | 10 2006 053 995 B3 | 4/2008 |
| DE | 10 2008 062 457 A1 | 6/2010 |
| WO | WO 2010/017939 A1 | 2/2010 |

\* cited by examiner

*Primary Examiner* — Andre Allen
(74) *Attorney, Agent, or Firm* — Jenkins, Wilson, Taylor & Hunt, P.A.

(57) ABSTRACT

A locking fastening device for fastening a first component to a second component, an adjustable fastening device for adjustably fastening a first component to a second component, and a component system including at least one first component that is fastened to a second component are described. Also described are a main wing of a wind tunnel model aircraft having an adjusting and fastening system which includes at least one locking fastening device and at least two adjustable fastening devices for adjusting and fastening an aerodynamic additional body that is adjustable relative to the main wing by means of a plurality of retaining devices, as well as a wind tunnel model aircraft having such a main wing.

15 Claims, 13 Drawing Sheets

LOCKING FASTENING DEVICE, ADJUSTABLE FASTENING DEVICE, COMPONENT SYSTEM, MAIN WING OF A WIND TUNNEL MODEL AIRCRAFT, AND WIND TUNNEL MODEL AIRCRAFT HAVING SUCH A MAIN WING

CROSS-REFERENCE TO RELATED APPLICATIONS

The present application claims priority from German Application DE 10 2010 053 277.0, filed on Dec. 2, 2010, and claims the benefit of U.S. Provisional application 61/418,988, filed on Dec. 2, 2010.

FIELD OF THE INVENTION

The invention relates to a locking fastening device for fastening a first component to a second component as well as an adjustable fastening device for adjustably fastening a first component to a second component, and a component system comprising at least one first component that is fastened to a second component, a main wing of a wind tunnel model aircraft, as well as a wind tunnel model aircraft having such a main wing.

BACKGROUND

Fastening devices are known and are used, e.g., for fastening components of models, in particular wind tunnel models of aircraft, to each other. Here a first component may be, for example, a model of a high lift body such as a leading edge flap or a slat, or a trailing edge flap, a so-called flap. Such a first component is fastened to a second component, for instance the model of a main wing of a model aircraft. In order to be able to simulate different flight situations in a wind tunnel, it is necessary to model the configuration of the high lift body with regard to individual flight situations. For an adjustment of the single components of such model aircraft relative to each other, for example in order to take the high lift body to a retracted or a extended position for a simulation of takeoff or cruising flight, these components are adapted to be adjusted relative to each other manually in known model aircraft.

As regards the adjustment of a first component such as, e.g., a leading edge flap or a trailing edge flap on a model aircraft, two geometrically relevant parameters should be influenced in particular. On the one hand it is necessary to adjust the distance between the first component and the second component, i.e., the so-called gap. On the other hand, a first and a second component such as a high lift body and a main wing of a model aircraft are usually overlapped, so that this consecutive arrangement of the individual components in the vertical direction, the so-called overlap, should also be adjustable. In known model aircraft the combination of oblong holes and washers allows to adjust the positions of the single components relative to each other in terms of their positions.

It is a drawback in the known model aircraft that the single components may be adjusted relative to each other only with great complexity. Thus it is necessary to partly loosen the individual fastening devices for fastening the first component to the second component, or to remove them completely. Following the complete removal, the components are oriented relative to each other with regard to the desired new configuration, i.e., the new relative position. This is followed by renewed fastening of the first component to the second component by means of the fastening devices. In addition to the high complexity of such a manner of proceeding, it is a drawback that an inadvertent alteration of the previously adjusted relative position of first component and second component may occur during the subsequent fastening operation. Particularly when it is necessary to firmly tighten screw connections for the respective fastening device, such tightening by means of torque wrenches or ratchet spanners may result in the first component being displaced as a result of fastening by means of the fastening devices, so that the desired configuration can at least partially not be maintained accurately. Accordingly an increased level of attention is necessary for adjusting the desired configuration, or in turn a certain error tolerance with regard to the adjusted configuration has to be accepted. As such models customarily are miniaturizations, in the case of model aircraft for instance at a scale of 1:21, the acceptance of a error tolerance nevertheless amounts to an error that is equally proportional at a ratio of 1:21 between the original to be studied and the model, and thus true to scale. At a scale of 1:21 this means that a deviation of the configuration at the modeling scale represents an error tolerance of the original part to be studied that is increased 21-fold. Accordingly such error tolerances should be kept particularly low or eliminated entirely in models for the construction of airplanes, for otherwise the measured results are not suited for making adequate statements concerning the original part.

SUMMARY

Various embodiments of the present invention remedy the drawbacks of known devices that were discussed in the foregoing. In particular embodiments of the present invention provide a locking fastening device as well as an adjustable fastening device and a corresponding component system comprising fastening devices, by means of which a fine adjustment of position and attitude of a first component relative to a second component as well as the adjustment of the first component relative to the second component may be performed with sufficient accuracy and in a particularly rapid, simple, and cost-efficient manner. Furthermore, embodiments of the invention provide a main wing of a wind tunnel model aircraft as well as a wind tunnel model aircraft having such a main wing whereby a respective fine adjustment of a first component relative to a second component and in particular of an aerodynamic additional body relative to a part of the main plane structure and in particular a main wing of the model aircraft may be carried out with sufficient accuracy, and fastening may be carried out in a particularly rapid, simple and cost-efficient manner.

The fastening device of various embodiments of the invention, i.e. the locking fastening device of various embodiments of the invention, the adjustable fastening device of various embodiments of the invention, as well as the component system of various embodiments of the invention is/are intended in particular for fastening components of models, in particular wind tunnel models of aircraft, to each other. By way of example such a first component may be a model of a control flap, a high lift body model such as, e.g., a model of a leading edge flap or a slat or a trailing edge flap. Such a first component is fastened to a second component, for example the model of a main wing of a model aircraft. In order to be able to simulate different flight situations in a wind tunnel, it is necessary to model the configuration of the high lift body with regard to the individual flight situations. As such model aircraft are not fully functional models but merely geometrical reproductions of the aircraft to be studied, the single components are consequently not equipped with adjusting mechanisms as in the case of the actual aircraft. In order to adjust the single components relative to each other, and to thus take the high lift body into a retracted or a extended position in order to simulate takeoff or cruising flight, it is therefore necessary to manually adjust the components relative to each other.

According to a first aspect of some embodiments of the invention, a locking fastening device for fastening a first component to a second component is provided, which comprises at least one locking screw having a locking screw head and a locking screw barrel. The locking fastening device is provided for fixing a selected or adjusted position and attitude of the first component relative to the second component. The locking screw barrel is provided with an external thread. The locking screw itself is adjusted to be connected, or is connected, to one of the two components, in particular to the second component. The connectability or connectedness may be realized, for instance, by integral formation with the second component. It is, however, also possible for a component through hole to be provided in the second component, through which the locking screw barrel of the locking screw protrudes so that the connection is produced by means of form-fit coupling or frictional coupling between the locking screw head and the second component. In other words, in the framework of the present invention both an integral and also a multi-part implementation of the locking screw relative to the respective component are possible.

Moreover at least one threaded sleeve is provided which presents at least one conical lateral surface of the threaded sleeve and one threaded sleeve through hole presenting an internal thread. By means of this internal thread the threaded sleeve is screwed onto the external thread of the locking screw in such a way that the smallest outer diameter of the conical lateral surface of the threaded sleeve points in the direction of the locking screw head. Accordingly, this means that the conical lateral surface of the threaded sleeve is inclined toward the locking screw barrel, as it were. A relative rotational movement between the locking screw and the threaded sleeve in this way concurrently brings about a forced movement of the threaded sleeve along the axis of rotation of the locking sleeve. Depending on the direction of the relative movement and due to the correlation of the internal thread and the external thread, the threaded sleeve thus either moves toward the locking screw head or away from it. If, now, the threaded sleeve is held in a fixed location and the locking screw rotates, it is thereby possible to produce a fixed movement of the threaded sleeve along the axis of the locking screw barrel.

In one embodiment of the locking fastening device of the invention there are moreover provided at least one clamping sleeve having an outer clamping sleeve surface and a clamping sleeve through hole. The clamping sleeve through hole has at least one conical inner clamping sleeve surface, the conical inclination angle of which corresponds to the conical inclination angle of the conical lateral surface of the threaded sleeve and into which the threaded sleeve is inserted such that the conical lateral surface of the threaded sleeve faces the conical inner clamping sleeve surface. In other words, the conical inner clamping sleeve surface corresponds to the conical lateral surface of the threaded sleeve. The correspondence of the two conical inclination angles means that the respective inclination angles are identical with regard to the conicity of the threaded sleeve lateral surface and the inner clamping sleeve surface, however have at least substantially the same amount. In particular the two inclination angles are contained within a range in which they differ from each other by less than 10 degrees.

Due to the arrangement of the conical lateral surface of the threaded sleeve relative to the conical inner clamping sleeve surface in accordance with the invention it is possible that due to the relation of these two conical surfaces, i.e. a conversion of the axial movements along the axis of rotation of the locking screw barrel of the threaded sleeve, as it were, this movement is transformed into a radial movement relative to the axis of the locking screw barrel. This is due to the fact that owing to a movement of the threaded sleeves toward the locking screw head, a physical contact between the conical lateral surface of the threaded sleeve on the one hand and the conical inner clamping sleeve surface on the other hand is established. If, now, a further rotation of the locking screw is carried out, then the threaded sleeve moves further toward the locking screw head. As a contact between the conical lateral surface of the threaded sleeve and the conical inner clamping sleeve surface now already exists, the clamping sleeve has to yield radially for the further axial movement of the threaded sleeve in order to make way for the threaded sleeve, as it were. In other words, the clamping sleeve is expanded radially by the continued displacement of the threaded sleeve toward the locking screw head.

In one embodiment of the locking fastening device of the invention, a locking sleeve is furthermore provided which may be, or is, connected to one of the components. It comprises a locking sleeve through hole, the inner locking sleeve surface of which is arranged opposite from the outer clamping sleeve surface. In this case, as well, the inner locking sleeve surface is located opposite from a surface of the clamping sleeve. The clamping sleeve which—in accordance with the discussion in the preceding paragraph—is expanded outwardly by a rotation of the locking screw and the axial movement of the threaded sleeve thus induced, will accordingly deform in such a way that the outer clamping sleeve surface enters into contact with the inner locking sleeve surface. This contact generates a clamping effect between the inner locking sleeve surface and the outer clamping sleeve surface, in particular frictional coupling, which results in an axial fixing of the locking sleeve relative to the axis of the locking screw barrel.

The locking sleeve itself is advantageously connected, either directly or indirectly, to one of the two components, in particular to the first component. Thus it is, for example, possible for the locking sleeve to be an integral or a fixed component part of a locking fixture which in turn constitutes a part of the first component. It is furthermore possible that nose-type extensions lead from the first component to a locking sleeve and are formed integrally with the latter. In this way it is possible for an axial fixing of the locking sleeve and thus also of the first component relative to the second component to be brought about through the clamping sleeve. In other words, by opening and closing, i.e. by the rotation of the locking screw in one or the other direction, the locking sleeve may be clamped or loosened. In its released condition, the locking sleeve may be displaced axially along the axis of the locking screw, while in the clamped condition it is secured axially relative to the axis of the locking screw. An adjustment of the axial distance of the locking sleeve is thus made possible in a particularly simple way, and thus also an adjustment of the first component relative to the second component in direction of the axis of the locking screw. In the case of a first component having the form of a model of a high lift body and a second component having the form of a model of a main wing of an aircraft, it is in this way possible in a particularly simple manner to adjust the so-called gap, i.e. the gap between the two components. Fastening by means of the corresponding cones of the threaded sleeve and the clamping sleeve here creates a radial expansion only and no movement whatsoever in an axial direction of the clamping sleeve or of the locking sleeve. The aligned position of the two components relative to each other is therefore not influenced by fastening with the aid of the cones of embodiments of the invention, for no force acts in the direction of adjustment, i.e. in the direction of the axis of the locking screw.

The conical surfaces mentioned in the foregoing should be understood to the effect that these surfaces present an angular inclination, in particular relative to an axis of symmetry and thus, e.g., a rotationally symmetrical axis. Here it may be possible for the conical surfaces to be not perfectly planar but to present one or several curvatures. Particularly in cases of rotationally symmetrical component parts, the conical surfaces are curved relative to the axis of rotation. A further curvature about an axis extending substantially transversely to the axis of rotation or axis of symmetry of the respective element, is equally conceivable. In order to ensure that both the mounting and adjusting capability of the first component relative to the second component is guaranteed in a particularly advantageous manner, the locking sleeve and the clamping sleeve are produced so as to form they form a clearance fit or a transition fit relative to each other. When a clearance fit is used, for example, the fit systems H8/d9, H8/e8, H8/f7, H8/h9, H7/g6, and H7/h6 are conceivable. When a transition fit for dimensioning and producing the locking sleeve and the clamping sleeve are used, for example the fit systems H7/j6, H7/m6 or H7/n6 are conceivable.

When such fit systems, i.e. a clearance fit or a transition fit, are used, then it has to be applied to the clamping sleeve and the locking sleeve in their non-clamped condition and thus in their non-deformed condition. In this way it is possible that a slight play and thus in particular a radial distance relative to the axis of the locking screw will remain between the clamping sleeve and the locking sleeve insofar as the clamping sleeve is not deformed. This distance allows for mobility along the axis of the locking screw, i.e. axial mobility, of the locking sleeve. In the same way, the use of a clearance fit or a transition fit of the distance in a radial direction between clamping sleeve and locking sleeve, relative to the axis of the locking screw, is reduced to a minimum so that the radial dimension of the expansion of the clamping sleeve is limited to a minimum. In other words, in this way the strain on the material due to the expansion of the clamping sleeve, just as the necessary distance that has to be covered by the threaded sleeve on the locking screw barrel, is reduced to a minimum.

With regard to the locking fastening device of embodiments of the present invention, the terms 'radial' and 'axial' should be understood to relate to the axis of the locking screw. Thus the locking screw, in particular the locking screw barrel thereof, defines an axis that is referred to as axial direction, as well as a radius starting out from this axis that should be understood to be a radial direction.

In order to ensure that the expansion of the clamping sleeve takes place in a sufficient manner, what takes place in particular is a splitting of the flux of force during the movement and in mounting of the threaded sleeve, or while it is being braced. Thus, the locking screw head of the locking screw advantageously attacks at a surface of the second component against which the locking screw may brace itself. On the one hand, the force is thus conducted away from the locking screw via its locking screw head to the component, in particular the second component. Via the thread the introduced force is additionally transmitted via the conical lateral surface of the threaded sleeve to the conical inner surface of the clamping sleeve, with the flux of force then being split inside the latter. On the one hand, the clamping sleeve is also supported against the second component so that clamping sleeve and locking screw head are jointly braced against the second component, to thus immobilize the entire locking fastening device on the second component. In addition a diversion of a part of the force introduced by the locking screw and its rotation takes place in a radial direction, so that an expansion of the clamping sleeve and a resulting clamping of the locking sleeve become possible. The proportion of such splitting may be influenced through the choice of the angle for the inclination of the conical surfaces.

It may be a further advantage if the outer diameter of the clamping sleeve is greater than or equal to the maximum outer diameter of the threaded sleeve. This means that the threaded sleeve, independently of its axial position on the locking screw barrel, can not protrude radially beyond the clamping sleeve. In this way it is possible that the locking sleeve may be mounted in a particularly simple manner is it only needs to be inserted over the clamping sleeve. In this way the range of movement of the locking sleeve is furthermore increased, for the locking sleeve is hereby prevented from abutting against a protruding part of the threaded sleeve.

It may moreover be advantageous in a locking fastening device of embodiments of the invention if a through sleeve is provided with a through sleeve through hole through which the locking screw barrel extends and which is arranged between the threaded sleeve and the locking screw head. This allows to relieve a load on the clamping sleeve with regard to its being supported against the second component. In contrast with the embodiment from the preceding paragraph, supporting the force against the second component here takes place via the through sleeve, so that the clamping sleeve may be designed in its geometrical dimensions and choice of material with a view to the desired expansion exclusively. The clamping sleeve thus is not subjected to any axial load or only a minimum axial load. The distance of the two sleeves—threaded sleeve and through sleeve—in particular is approx. 0.5 mm, so that the flux of force is redirected via the clamping sleeve.

It is moreover possible that in a locking fastening device of embodiments of the present invention the through sleeve comprises at least one conical through sleeve lateral surface. The through sleeve advantageously is arranged such that the smallest diameter of the conical through sleeve lateral surface points in the direction of the smallest diameter of the conical lateral surface of the threaded sleeve. The clamping sleeve has at least one further conical inner clamping sleeve surface, the conical inclination angle of which corresponds to the conical inclination angle of the conical through sleeve lateral surface and which are facing each other. In other words, in this way a second inner sleeve having an axially complementary orientation relative to the threaded sleeve is formed by means of the through sleeve. The inclination angle of the through sleeve and of the threaded sleeve relative to their conical lateral surfaces are directed opposite to each other. In this way, bracing by means of the locking screw generates a continuous and in particular symmetrical introduction of force to the clamping sleeve, so that the expansion of the clamping sleeve in a radial direction relative to the distribution of expansion in an axial direction takes place in a substantially symmetrical manner. In other words, the amount of expansion of the clamping sleeve is substantially as uniform as possible in every axial position along the axial direction of the locking screw, so that the clamping effect, i.e. the frictional coupling between the clamping sleeve and the locking sleeve, takes place substantially across the entire surface of contact between the outer clamping sleeve surface and the inner locking sleeve surface. In this way the intensity of this frictional coupling is advantageously also distributed substantially uniformly over the axial extension of the corresponding surfaces.

It may furthermore be advantageous in a locking fastening device of embodiments of the invention if locking screw barrel may extend or be positioned through a component through hole of one of the two components in such a way that the locking screw head is arranged on the one side and the threaded sleeve and/or the through sleeve on the other side of these components. Such an arrangement allows the locking screw to be formed separately from the component. Its fastening to the component, in particular to the second component, thus takes place by bracing across the component through hole. Additionally, clamping on this component furthermore allows to obtain radial securing relative to the radial direction, i.e. relative to a radial direction with regard to the locking screw. If, now, the component through hole is advantageously formed in such a way that the outer diameter of the locking screw barrel is smaller than the component through hole, loosening the locking screw to thereby cancel the effect of clamping on the component through hole allows an additional degree of freedom of the locking screw and thus of the locking fastening device as a whole. For instance, the component through hole may have the form of an oblong hole, which allows a radial displacement of the locking fastening device. A combination of such a component through hole with a locking fastening device of embodiments of the invention thus allows to perform not only an axial adjustment of the locking sleeve but also a radial adjustment of the entire locking fastening device after the locking screw was loosened. Following tightening of the locking screw, both the radial degree of freedom and the axial degree of freedom are blocked concurrently, so that the components are immobilized relative to each other both radially and axially.

In parallel with or alternatively to the locking fastening device described in the foregoing there is a possibility of using an adjustable fastening device in order to position the first component relative to the second component. Although it is already readily possible in the case of the locking fastening device of the preceding discussion to ensure in the manner of embodiments of the invention an adjustment and fastening of the two components relative to each other, the adjustment itself may nevertheless be carried out in an even more simple manner if an adjustable fastening device is provided which also forms part of various embodiments of the invention.

According to a further aspect of some embodiments of the invention, an adjustable fastening device for adjustably fastening a first component to a second component, a retaining screw having a retaining screw head and a retaining screw barrel presenting an external thread is provided. This retaining screw may be, or is, connected to one of the components, in particular to the second component. As regards the locking fastening device, the retaining screw should thus be understood as an equivalent for the locking screw of the locking fastening device.

One embodiment of the adjustable fastening device of the invention comprises an adjusting spindle presenting an external thread and having an axial adjusting spindle opening extending along the axis of rotation of the adjusting spindle and presenting an internal thread. The adjusting spindle is integrated into the adjustable fastening device in such a way that rotating it allows a fine adjustment of the position and attitude of the first component relative to the second component. The retaining screw barrel is screwed into the internal thread of the adjusting spindle in such a way that the retaining screw head may be, or is, arranged on one side and the adjusting spindle on the other side of a component through hole. In other words, in this way it is possible that the adjustable fastening device may brace itself on the second component between the retaining screw head and the adjusting spindle. Due to this frictional coupling, or through this form-fit coupling, it is possible that the adjustable fastening device is immobilized in its position on the second component. Other than the locking screw of a locking fastening device of embodiments of the invention, the retaining screw here does not serve for adjustment by rotation but exclusively for fixing of the adjustable fastening device on the respective component, in particular the second component. This fixing is only released for subsequently performing an adjustment by means of the adjustable fastening device. In order to further improve the fastening, i.e. the immobilization of the adjustable fastening device on the second component, the retaining screw is advantageously fastened in the internal thread of the adjusting spindle by means of screw adhesive such as, e.g., Loctite. In order to cancel the immobilization of the adjustable fastening device it is sufficient if the retaining screw rotates by a ¼ or a ½ turn relative to the adjusting spindle, so that the frictional coupling or the form-fit coupling between the second component and the adjusting spindle, and thus the retaining screw head, is released.

Furthermore at least one adjusting sleeve is provided which may be, or is, connected to one of the two components, in particular the first component. The adjusting sleeve comprises an adjusting sleeve through hole presenting an internal thread which is screwed onto the external thread of the adjusting spindle. In consequence, a relative rotation of adjusting spindle and adjusting sleeve generates an axial relative movement vis-à-vis the axis of rotation of the retaining screw. As regards the expressions 'axial direction' and 'radial direction' used in connection with the adjustable fastening device, these relate to the axis of the retaining screw, or the radial direction relative to this axis.

One embodiment of the adjustable fastening device of the invention operates in such a way that in order to release the fastening device prior to the subsequent adjustment of the two components relative to each other, in a first step the retaining screw is loosened. This may be achieved, e.g., by a rotation of the retaining screw relative to the adjusting spindle by a ¼ or a ½ turn. After the frictional coupling and/or the form-fit coupling between the second component and the retaining screw or the adjusting spindle was cancelled, the system consisting of adjusting spindle and retaining screw is free to rotate relative to the component through hole of the respective component, in particular the second component. In other words, it is possible for the adjusting spindle to rotate freely about the axis of the retaining screw. If this is carried out and concurrently the adjusting sleeve is secured against rotation, then an axial movement of the adjusting sleeve takes place because the retaining screw together with the adjusting spindle as a unit is still immobilized in an axial direction by the component through hole. In other words, as a result of a rotation of the adjusting spindle, the adjusting sleeve moves upwards or downwards relative to the axial direction. Here it should be noted that the retaining screw moves jointly as a result of the rotation of the adjusting spindle, i.e. a joint rotation of this unit takes place. Accordingly, the retaining screw thus serves exclusively for immobilizing, i.e. fastening, the adjustable fastening device to the second component.

This equally presents the advantage that the axial adjustment by means of the adjustable fastening device, i.e. through the intermediary of the adjusting sleeve, may take place independently of the immobilization by means of the retaining screw. As a result, the adjustment of two components with regard to their relative location may take place independently of the fixation of the set position. With regard to the simple embodiment that was explained in the foregoing with respect to the locking fastening device, an adjustable fastening device allows for the same advantages plus the further advantage that the adjustment of the first component relative to the second component itself may take in an even more targeted and simple manner. In this embodiment, the fastening device in its quality of an adjustable fastening device thus obtains the dual function of both fastening and adjustment.

By the rotation of the adjusting spindle the distance of the two components relative to each other in an axial direction may be adjusted in a particularly accurate manner. Once it has been adjusted, the adjustable fastening device is again clamped on the second component an the component through hole thereof by a brief ¼ or ½ turn of the retaining screw, to thereby carry out a complete fixation.

For the case that the first component is the model of a high lift body and the second component is the model of a main wing of an aircraft, an adjustable fastening device in accordance with the preceding discussion allows to adjust the distance of the two components relative to each other with regard to the gap between the two components, i.e. the so-called gap. In other words, this functionality may be referred to as a gap adjustment. It is, of course, possible—as will be explained later on—to use single fastening devices in combination with each other to thereby allow supporting the individual components across a greater length. Here it is also possible to combine adjustable fastening devices of embodiments of the present invention with locking fastening devices of embodiments of the present invention so that the higher complexity of the adjustable fastening device in terms of construction only needs to be accepted in individual cases, while at the same time the locking fastening devices of embodiments of the present invention having a technically and constructively more simple design may be used across a multiplicity of supporting positions. It should be noted, however, that the locking fastening device just like the adjustable fastening device are alternative embodiments which both serve for the mutual fastening and adjustment of a first component and a second component with regard to the relative location.

The axial adjusting spindle opening does not necessarily have to be a through hole but may rather also be executed as a blind bore. Particularly in systems where an improved additionally is to take place on the adjusting spindle, it may be advantageous if the adjusting spindle opening is closed on one side to thus represent a blind bore version.

The relative rotation between adjusting sleeve and adjusting spindle may moreover be carried out in very different ways. One most simple possibility is if the corresponding user holds the adjusting sleeve by hand or with an appropriate tool while rotating the adjusting spindle by hand or with an additional tool. It is, of course, also conceivable that a rotation of the adjusting sleeve is already prevented by the arrangement of the adjusting sleeve in or on the respective component, in particular the second component. In this way handling is simplified even further, for it is only required to perform rotating the adjusting spindle while retaining the adjusting sleeve takes place automatically.

As in rotating the adjusting spindle for adjusting the adjusting sleeve may be rotated as a unit, as it were, jointly with the retaining screw, it is possible for the adjusting spindle opening to be arranged eccentrically relative to the axis of rotation of the adjusting spindle.

A multiplicity of openings in the adjusting spindle are, of course, also conceivable to be able to ensure improved immobilization of the adjustable fastening device relative to the respective component, in particular the second component, as long as the necessary rotatability of the adjusting spindle exists.

It may moreover be advantageous in an embodiment of the adjustable fastening device of the invention if a blocking device is provided which prevents, in particular by means of an at least partial form-fit coupling with at least one portion of the adjusting sleeve, a relative rotation of the adjusting sleeve relative to the adjusting spindle. Such a blocking device may be obtained, for instance, through the geometrical configuration of the second component. Thus it is conceivable for a depression in the second component being adapted to receive the entire adjustable fastening device. The geometrical shape of this depression is adapted, at least in portions thereof, to the geometrical outer contour of the adjusting sleeve, whereby a rotation of the adjusting sleeve in this depression is prevented. Following insertion of the adjustable fastening device a relative rotation between adjusting spindle and adjusting sleeve is in this way prevented from taking place during an adjustment of the adjusting sleeve in an axial direction.

It is a further possible embodiment for such a blocking device if a pin-type extension engaging in a corresponding depression of the adjusting sleeve is provided on the respective component, in particular the second component. This depression, just like the pin-type extension, advantageously extend substantially along the axis of the retaining screw. In other words, while the adjusting sleeve is being adjusted, it is moved on the pin-type extension by means of its depression. A reverse implementation, i.e. a depression in the respective component, in particular the second component, and a pin-type extension on the adjusting sleeve is, of course, also conceivable.

In order to ensure that a radial adjustability by means of the adjusting device or separately therefrom is made possible, both the adjusting device and the component through hole are advantageously executed such as to enable a radial mobility of the entire adjustable fastening device relative to the respective component, in particular the second component.

It may be a further advantage in an embodiment of the adjustable fastening device of the invention if the adjusting spindle comprises an auxiliary adjusting device which in particular facilitates a rotation of the adjusting spindle relative to the adjusting sleeve through at least partial form-fit coupling or frictional coupling with a tool. Such an auxiliary adjusting device may be, for example, a depression or a blind bore in the adjusting spindle which is inserted centrally or in a decentralized manner relative to the axis of rotation of the adjusting spindle. A simple depression being suited for inserting a pin-type tool may be used for this purpose, so that the rotation may be initiated with the aid of this pin-type tool. A multiplicity of such depressions corresponding to a substantially fork-type tool is equally conceivable in this embodiment. It is furthermore possible that the depression constitutes a standardized depression which may cooperate, e.g., with hexagon socket screw keys or other screw drivers. It is, of course, also conceivable for the auxiliary adjusting device to present a knurling applied directly on the adjusting spindle. In the case of such a knurling a user's hand may attack directly, and owing to the increased resistance, i.e. due to the increased coefficient of friction between hand and knurling, facilitated rotation for the adjustment of the adjusting sleeve may be carried out.

It may moreover be advantageous in an embodiment of the adjustable fastening device of the invention if a lock nut having an internal thread is screwed onto the external thread of the adjusting spindle such that the adjusting sleeve is situated between the retaining screw head and the lock nut. The lock nut is screwed onto the external thread of the adjusting spindle until it abuts the adjusting sleeve and then tightened. In this way additional axial securing due to clamping between the lock nut and the adjusting sleeve may take place. It is furthermore ensured that an inadvertent rotation adjusting spindle even in the event of vibrations and thus an inadvertent adjustment of the adjusting sleeve in an axial direction is prevented. The lock nut thus represents additional securing of the adjusting sleeve in an axial direction.

It may moreover be advantageous in an embodiment of the adjustable fastening device of the invention if a radial adjusting sleeve opening presenting an internal thread and extending transversely to the axis of rotation of the adjusting spindle is provided in the adjusting sleeve. This internal thread is in threaded engagement with an external thread of an adjusting screw barrel, wherein the adjusting screw comprises an adjusting screw head which may be, or is, arranged in a component retaining slit of one of the two components, in particular the second component, in such a way that the adjusting screw barrel protrudes from this component retaining slit transversely to the axis of rotation of the adjusting sleeve. In other words, in this way an additional possibility of adjustment, namely in a radial direction, for the adjustable fastening device is brought about. The entire adjustable fastening device may be displaced radially by rotating the adjusting screw which is immobilized relative to the component, in particular the second component, due to the insertion of the adjusting screw head. Depending on the sense of rotation, the adjusting sleeve and thus the adjustable fastening device is therefore pushed away from the adjusting screw head or pulled towards it.

This presents the additional advantage that due to the insertion of an adjusting screw, the adjusting sleeve is immobilized with regard to a rotation about the retaining screw axis by the second component, with this adjusting screw accordingly serving at the same time as a securing device against a rotation of the adjusting sleeve. In other words, the dual function of the radial adjustability is here achieved by means of the blocking device.

In the case of a first component having the form of a model of a high lift body and a second component having the form of a model of a wing of an aircraft, the so-called overlap between the two components may be adjusted through the intermediary of the radial adjustability. The component retaining slit of a fastening device of various embodiments of the invention comprises, in particular in the second component, a slit through which the adjusting screw barrel may protrude. This slit is advantageously formed to be substantially parallel from its bottom to its opening, or in turn to widen toward the opening, so that when the first component is clamped relative to the second component, a slight rotation of the adjusting screw relative to the component retaining slit is possible. This avoids an unnecessarily high shear strain to the adjusting screw, in particular the adjusting screw head. This may be improved further if the adjusting screw head is at least partly chamfered, in particular if it has a lens shape. In this way the rotatability for avoiding a clamping of the adjusting screw is improved even further.

According to a further aspect of some embodiments of the present invention, a component system comprising at least one first component that is fastened to a second component is provided. Such a component system comprises at least two mutually separate fastening devices for fastening the first component to the second component. Of these, at least one fastening device has the form of an adjustable fastening device whereby the position of the first component relative to the second component may be adjusted. In particular, this adjustable fastening device is an adjustable fastening device of embodiments of the present invention as discussed in depth in the foregoing.

Moreover at least one component through hole for each fastening device is provided through which a barrel of a screw of the respective fastening device for connecting it to the component protrudes. This is the component through hole which was explained in depth as a correlation for the retaining screw of the adjustable fastening device of embodiments of the present invention, or for the locking screw of the locking fastening device of embodiments of the present invention, respectively.

Furthermore at least one component retaining slit for the adjustable fastening device is provided in which the adjusting screw head of an adjusting screw is arranged. In other words, a component system of embodiments of the present invention is a combination of at least two fastening devices, with at least one of these fastening devices being an adjustable fastening device. As was already indicated briefly in the foregoing, it is possible in this way to combine the particularly advantageous adjustability by means of a adjustable fastening device with the technical and constructive simplicity of a locking fastening device. In particular in the use for component systems having the purpose of modeling a model aircraft, wherein a first component thus is, e.g., a model of a high lift body and a second component represents, e.g., a model of a main wing of an aircraft, a multiplicity of fastening devices is necessary for the load transfer. If, for instance, thirteen fastening devices are used, then it is possible to use an adjustable fastening device for adjusting the first component relative to the second component at the inner edge, i.e. on the fuselage in terms of an aircraft, at the center, and at the outer edge, i.e. at the end of the span of the wing. In between, in particular five locking fastening devices each are used which are clearly more cost-efficient, and whose adjustability is made possible by the adjustable fastening devices. In other words, in the immobilized condition a force transfer across all of the thirteen bearing points and thus all thirteen fastening devices is possible. In the released condition of all of the locking fastening devices and all of the adjustable fastening devices, an adjustment of the first component relative to the second component may be effected by means of the three adjustable fastening devices. Subsequently all of the fastening devices, i.e. the adjustable fastening devices as well as the locking fastening devices, are immobilized again so that the load transfer may take place in the desired manner across all thirteen fastening devices.

It may be an advantage in a component system of embodiments of the invention if at least one of the fastening devices has the form of a locking fastening device of various embodiments of the invention. Furthermore it may be advantageous if the adjustable fastening device of a component system of embodiments of the invention is an adjustable fastening device of the above embodiments of the invention. In both cases, in particular if they are combined, it is possible to provide a component system which may be fastened in a particularly simple manner and also adjusted in a particularly simple manner.

It may be an advantage in the component system of embodiments of the invention if the first component is a high lift body model and the second component is a main wing model of a model aircraft. In particular in such model aircraft used for examining or surveying model aircraft in a wind tunnel, a component system of the invention, in particular by means of adjustable fastening devices of embodiments of the invention and locking fastening devices of embodiments of the invention, serves to reduce the setup time, i.e. the time period required for adjusting the positions of the components relative to each other, to a minimum. In addition the constructive complexity for the production of the model aircraft with regard to the fastening device is reduced to a minimum.

According to a further aspect of the invention, a main wing of a wind tunnel model aircraft is provided having an adjusting device comprising at least one locking fastening device and at least two adjustable fastening devices for adjusting and fastening an aerodynamic additional body by means of a plurality of retaining devices, which is adapted to be adjusted relative to the main wing and that may in particular be a high lift body such as a leading edge flap or a trailing edge flap, wherein the main wing comprises oblong holes spaced apart from each other in the spanwise direction of the main wing for receiving a respective adjusting device or a fixation device each, wherein to each of the adjusting device or fixation device a retaining device coupled or fastened. The adjusting device comprises at least two adjustable fastening devices for adjusting the distance of the high lift body relative to the main wing in the direction of depth and the direction of thickness of the main wing as well as at least one locking fastening device for immobilizing the position of the aerodynamic additional body or high lift body relative to the main wing. Here the at least one locking fastening device is generally adapted for immobilizing the position of the aerodynamic additional body or of the high lift body relative to the main wing. The adjustable fastening devices and/or the locking fastening device may in particular be implemented in accordance with one of the embodiments of the invention.

Each of the two adjustable fastening devices is provided for adjusting the distance of the high lift body in the location along the span of the respective adjustable fastening device relative to the main wing in the direction of depth and the direction of thickness thereof and is in each instance formed of a pair of a spindle and a retaining screw received in a bore thereof presenting an internal thread and penetrating an oblong hole, which are disposed on opposite sides of the main wing. I.e., the screw head of the retaining screw is situated on a first side of the main wing and penetrates the respective oblong hole. The spindle is situated on the second side of the main wing opposite to the first side. Moreover the adjustable fastening device comprises: a fitting or a fastening sleeve that is fasted by means of a retaining device to the aerodynamic additional body, that is in threaded engagement with an external thread of the spindle, as well as a fixing means for immobilizing a rotational position of the spindle relative to the retaining screw. The fixing means may in particular consist of a fixing nut which is screwed onto the fitting on the second side presenting the external thread of the spindle such that the fitting is situated between the fixing nut and the oblong hole area of the main wing. By means of tightening the fixing nut on the fitting, a flux of force is generated between fixing nut, fitting and spindle, so that the rotational adjustment of the spindle relative to the component or the main wing is immobilized by tightening the fixing nut. When the fixing nut is loosened, the spindle is moreover rotatable relative to the retaining screw and thus the fitting is movable on the spindle in the direction of thickness for adjusting the aerodynamic additional body or the high lift body of the fitting in the direction of thickness, and displaceable in the oblong hole for adjusting the fitting in the direction of depth of the main wing.

According to another aspect of some embodiments of the invention, a wind tunnel model aircraft having a main wing in accordance with embodiments of the invention and an aerodynamic additional body coupled to the adjusting and fastening system, in particular a high lift body, is provided.

BRIEF DESCRIPTION OF THE DRAWINGS

In the following, the present invention shall be explained in more detail by referring to the annexed figures of the drawings, where the used expressions "left", "right", "top" and "bottom" refer to the representation of the figures of the drawings when perceived by the observer in an orientation in which the reference symbols may be read normally.

DESCRIPTION

Figure 1:
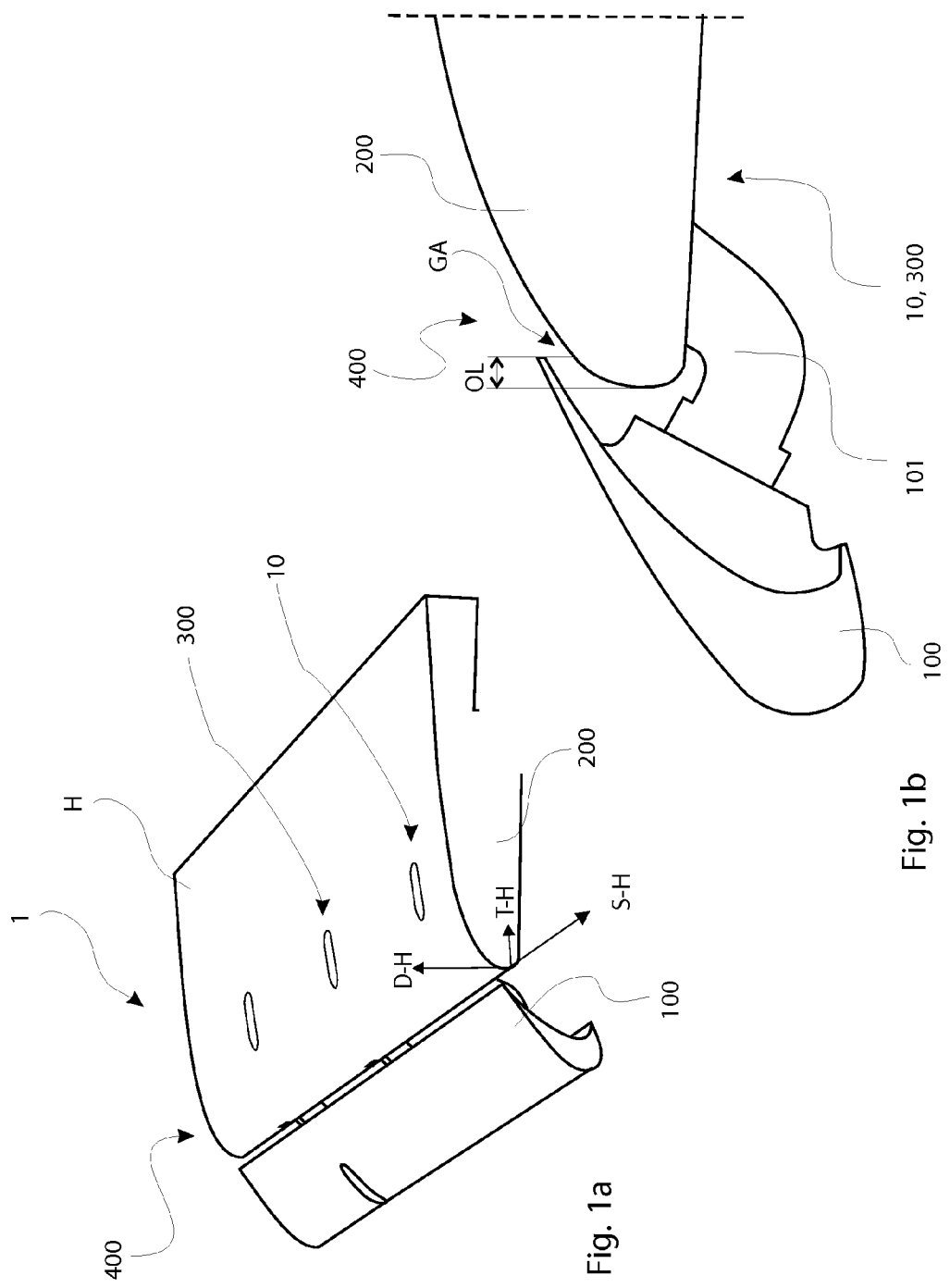
FIG. 1a is an isometric view of a component system according to the prior art.
FIG. 1b shows a schematic cross-sectional view of the component system of FIG. 1a, FIG. 2 shows an embodiment of a locking fastening device of an embodiment of the invention.

In FIGS. 1a and 1b an embodiment of known component systems 400 is represented. Here a component system having the form of a model of a wing of a model aircraft is represented, with the first component 100 representing a high lift body model having the form of a leading edge wing and the second component 200 being constituted by a model of a main wing H of a model aircraft. For purposes of orientation, a coordinate system including a direction of span S-H, a direction of depth T-H and a direction of thickness D-H of the main wing H is represented on the main wing H.

The two components 100 and 200 have to be adjusted in their location relative to each other for wind tunnel experiments. Here the adjustment of the components 100 and 200 relative to each makes possible different configurations that may image the aircraft's wing, for example in a landing configuration, a takeoff configuration or in a cruising configuration. The individual positions of the components 100 and 200 relative to each other may in particular be expressed by two parameters that are relevant inside the wind tunnel in terms of aerodynamics. These are drawn in FIG. 1b as Overlap OL and Gap GA. The Overlap OL relates to the overlap in the direction of depth between the first component 100 having the form of the high lift body and the second component 200 having the form of the wing. In addition, the distance in the direction of thickness of the wing, i.e. the second component 200, is referred to as Gap GA. This also is the width of the gap through which a current may flow between the two components 100 and 200. Depending on the flight situation, different configurations of the two components 100 and 200 relative to each other are necessary which may be adjusted with the aid of the adjusting device 1 of embodiments of the invention having the fastening devices 10 and 300 and a respective retaining device 101 arranged thereon. Fastening devices 10 and 300 of this kind shall be explained in more detail in the following. They are distributed regularly across the direction of span of the two components 100 and 200, to result in an effect of supporting and thus transmitting the forces engendered by the current acting on the high lift body of the first component 100 and the second component 200 having the form of the main wing.

Figure 2:
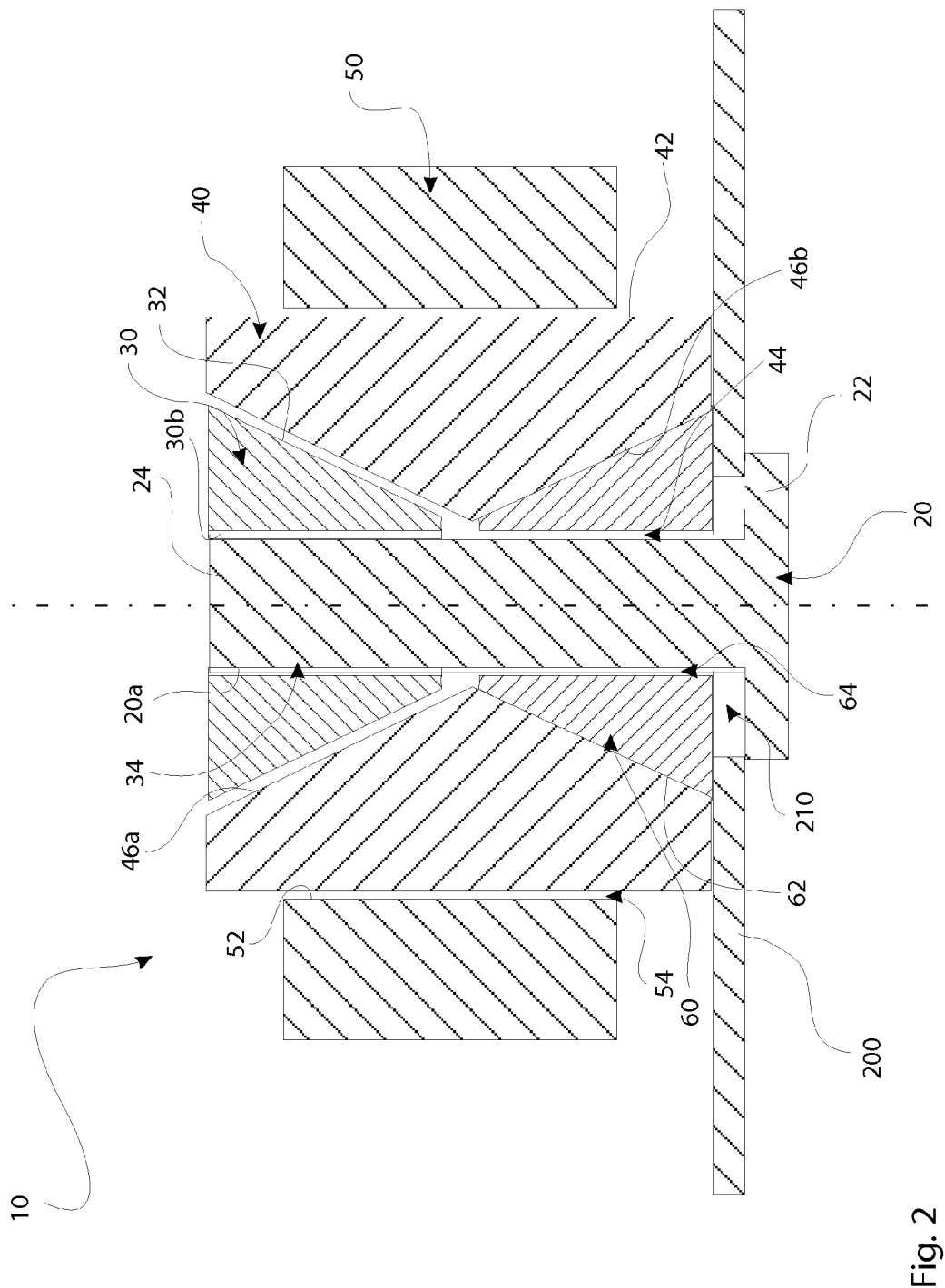

In FIG. 2 a first embodiment of a locking fastening device of the invention 10 is represented. This locking fastening device 10 is a particularly simple embodiment which serves for fastening the two components 100 and 200 to each other. This locking fastening device 10 serves for fastening while not including any active possibility of adjustment yet. Rather, adjustment is effected by hand or by means of additional means such as mechanical tools, so that following the adjustment by means of the locking fastening device 10, the adjusted configuration of the two components 100 and 200 relative to each other may be immobilized.

For the purpose of this immobilization the locking fastening device 10 comprises a central locking screw 20 which is equipped with a locking screw barrel 24 and a locking screw head 22. The locking screw barrel 24 is provided, at least in portions thereof, with an external thread 20a. Onto this external thread 20a a threaded sleeve 30 is screwed which comprises a threaded sleeve through hole 34 having an internal thread 30b. If, now, a relative rotation between the locking screw 20 and the threaded sleeve 30 is produced, then the threaded sleeve 30 moves upwards or downwards relative to the axis of the locking screw 20, i.e. in an axial direction.

The threaded sleeve 30 further comprises a conical lateral surface 32 which is oriented such that the smallest outer diameter of this conical lateral surface of the threaded sleeve 34 faces the locking screw head 22 of the locking screw 20. This conical lateral surface of the threaded sleeve 32 corresponds to a first inner clamping sleeve surface 46a of a clamping sleeve 40, with this correspondence being expressed by the conical inclination angles of the conical lateral surface of the threaded sleeve 32 and the inner clamping sleeve surface 46a being similar or identical to each other, and the two surfaces 46a and 32 substantially facing each other.

In addition the embodiment of FIG. 2 comprises a through sleeve 60 possessing a through sleeve through hole 64 through which the locking screw barrel 24 of the locking screw 20 protrudes. Due to the fact that no thread is provided in the through sleeve through hole 64, there is no engagement between the through sleeve 60 and the locking screw 20. These two components are rather independent of each other as regards rotation. Nevertheless the through sleeve 60 is in a position between the threaded sleeve 30 and the locking screw head 22, so that clamping and thus fastening of the locking fastening device 10 on the second component 200 at its component through hole 210 may be effected. In other words, the locking fastening device 10 is jammed tight on the component through hole 210 between the locking screw head 22 and the through sleeve 60.

For the purpose of clamping fastening of a locking sleeve 50, a clamping sleeve 40 is provided which in the present embodiment further comprises an additional conical inner clamping sleeve surface 46b, which in turn corresponds to a conical through sleeve lateral surface 62 of the through sleeve 60. The respective conical lateral surfaces of the through sleeve 60 and the threaded sleeve 30 have a mutually opposite orientation, so that their conical inclination angles have substantially a same amount but opposite signs. Around the clamping sleeve 40 the locking sleeve 50 is placed, of which the inner locking sleeve surface 52 of a locking sleeve through hole 54 is situated to face the outer clamping sleeve surface 42.

Figure 3:
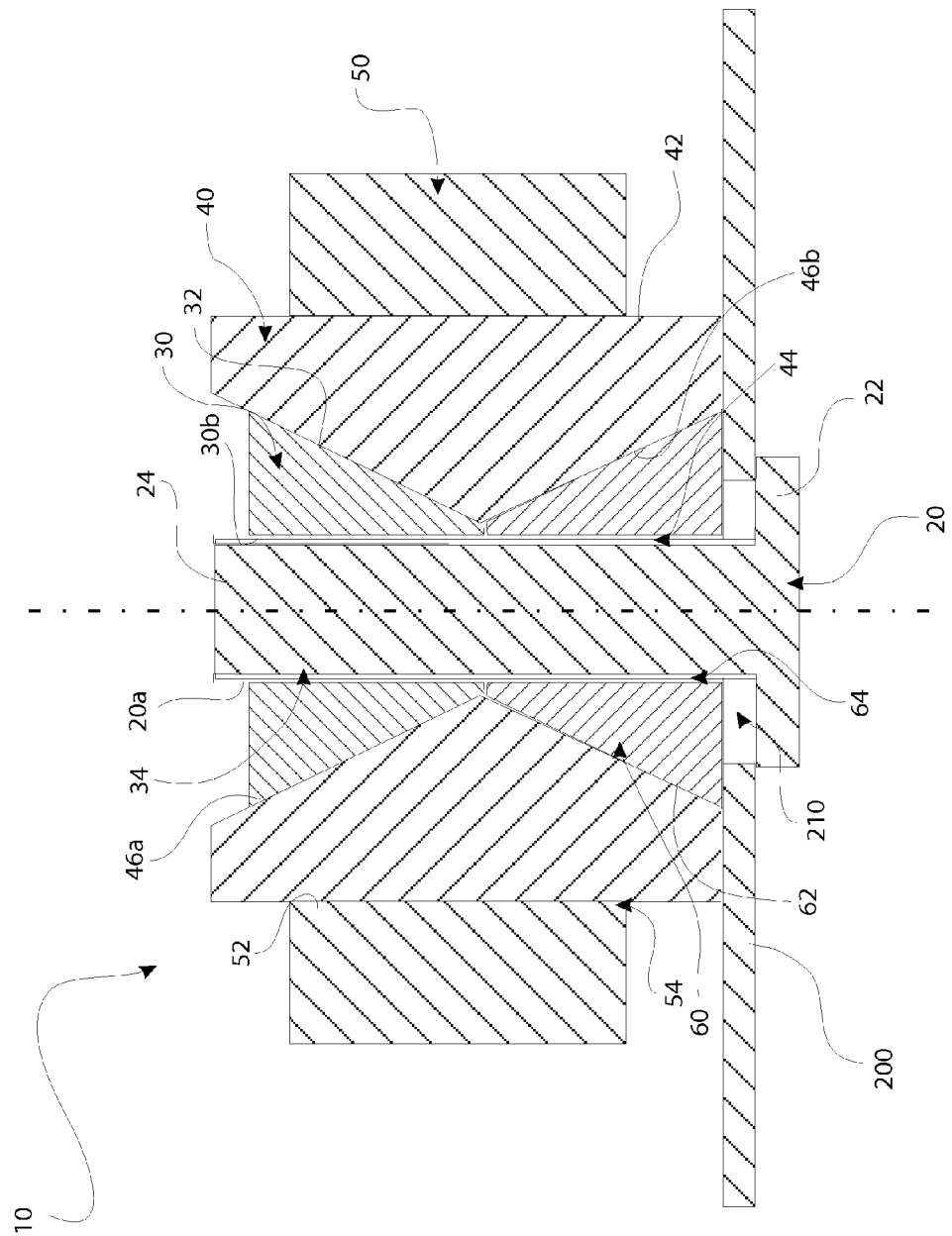
FIG. 3 shows the locking fastening device of FIG. 2 in a clamped condition.

In the following the manner of functioning of a locking fastening device of embodiments of the invention 10 shall be explained briefly. This function is described by referring to FIGS. 2 and 3. FIG. 2 shows the released condition, while FIG. 3 shows a clamped position of the locking fastening device 10. In the released condition of FIG. 2, the threaded sleeve 30 is in a position in which its conical lateral surface of the threaded sleeve 32 is spaced apart from the conical inner clamping sleeve surface 46a. The clamping sleeve 40 thus is in its relaxed position, so that the fit between the outer clamping sleeve surface 42 and the inner diameter of the locking sleeve through hole 54 is the one following their manufacture. Such a fit advantageously is a clearance fit or, in turn, a transition fit so that in the relaxed condition of FIG. 2, a displacement of the locking sleeve may easily be brought about by hand or with the aid of simple tools in an axial direction along the axis of the locking screw.

The locking sleeve 50, not represented in FIG. 2 for reasons of clarity, is connected to the first component 100. When the first component 100 is immobilized relative to the second component and this positioning operation is concluded, then the immobilized position is fixed by taking the locking fastening device 10 into a condition as shown in FIG. 3. This is made possible by rotating the locking screw 20 to thereby cause through the relative rotation between the locking screw 20 and the threaded sleeve 30 a movement of the threaded sleeve 30 toward the locking screw head 22. This movement i.a. has the effect that the conical lateral surface of the threaded sleeve 32 enters into contact with the conical inner clamping sleeve surface 46a. This establishes a force path that is introduced from the surface of contact between the second component 200 via the locking screw head 22, the locking screw barrel 24 via the threaded connection to the threaded sleeve 30, into the clamping sleeve 40. In the clamping sleeve 40 the introduced force, which is generated by continued rotation of the locking screw 20, is split up. This splitting on the one hand results in a part of the of the force being used for creating a support against the component 200. This supporting takes place via the second conical inner clamping sleeve surface 46b which is in contact with the conical through sleeve lateral surface 62. This force may in turn be supported, via the contact between the through sleeve 60 and the second component 200, on the latter.

Concurrently a radial expansion of the clamping sleeve 40 takes place via the two conical lateral surface 32 and 62 of the threaded sleeve 30 and the through sleeve 60. In other words, the clamping sleeve 40 is elastically deformed, resulting in an increase of its outer diameter. The outer clamping sleeve surface 42 then moves radially to the outside and enters into contact with the inner locking sleeve surface 52. This contact is brought about by expansion of the clamping sleeve to such a degree that a frictional coupling between the clamping sleeve 40 and the locking sleeve 50 is adjusted. This frictional coupling creates axial securing, thereby preventing the possibility of the locking sleeve 50 slipping in the axial direction along the axis of the locking screw 20. The locking sleeve 50 thus is immobilized in its axial position by mere rotation and thus without applying an axial force to it. Avoiding an axial force in fastening the locking sleeve 50 allows to reduce an inadvertent displacement of the locking sleeve 50 to a minimum or avoid such displacement entirely. FIG. 3 shows the expanded condition of the clamping sleeve 40 and thus the clamped condition, i.e. the immobilized or fastened condition of the fastening sleeve 40 and thus the fastened condition of the first component 100 on the second component 200.

Figure 4:
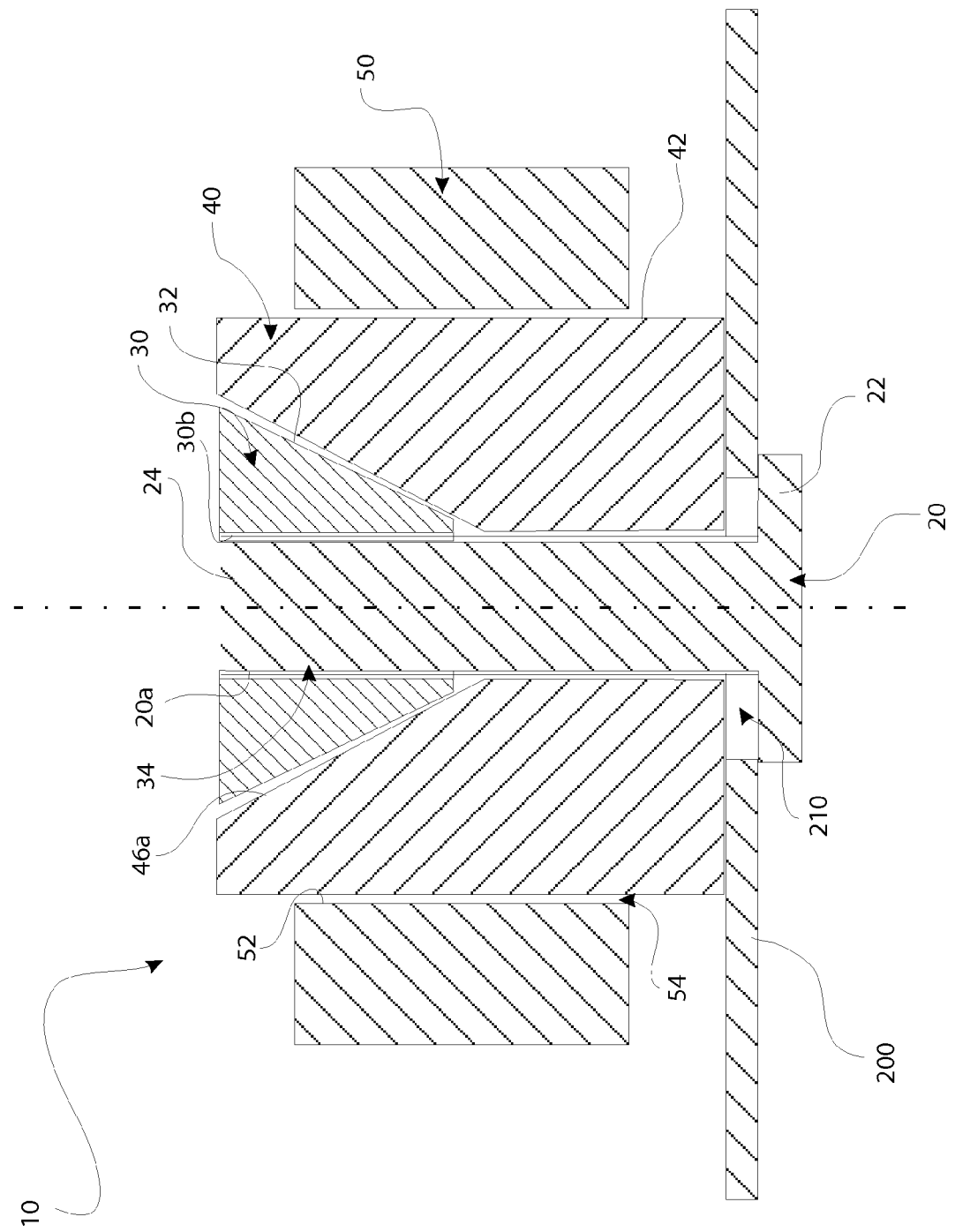
FIG. 4 shows a further embodiment of a locking fastening device of the invention.

In FIG. 4 an alternative embodiment of the adjustable fastening device 10 for the embodiment of FIGS. 2 and 3 is represented. In difference from the embodiment of FIGS. 2 and 3, the through sleeve 60 is omitted in the present embodiment. Rather, the clamping sleeve 40 is configured such that supporting the force from the locking screw 20 may take place directly through the clamping sleeve 40. In this way it is possible to omit the through sleeve 60 and thus reduce the complexity of the system as a whole. However a system of the embodiment in accordance with FIGS. 2 and 3 presents the advantage of a substantially symmetrical expansion of the clamping sleeve 40 being achieved through the opposite orientation of the conical lateral surfaces 32 and 62 of the threaded sleeve 30 and the through sleeve 60. In other words, the outer clamping sleeve surface 42 executes a substantially fully regular movement away from the axis of the locking screw 20, so that a uniform contact and thus a uniform frictional coupling between the outer clamping sleeve surface 42 and the inner locking sleeve surface 52 may be obtained across the extension of the axis of the locking screw 20.

Figure 5:
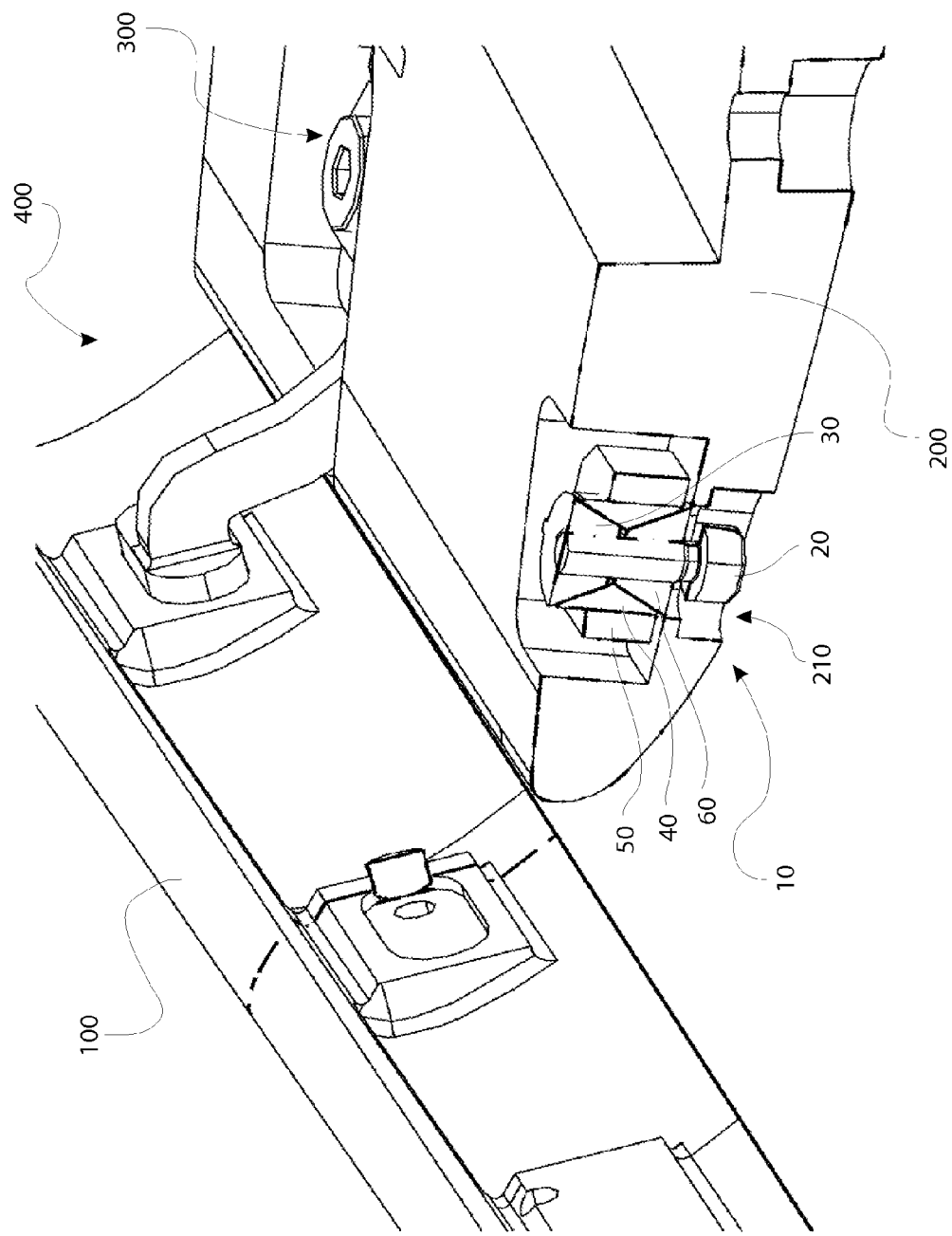
FIG. 5 shows a further embodiment of a locking fastening device of the invention.

In FIG. 5 an embodiment of the locking fastening device 10 as explained, e.g., in FIGS. 2 and 3, is represented in the isometric partial sectional view. Here it may be seen in the schematic view that the locking screw 20 is connected directly to the second component 200 in that the locking screw barrel 20 protrudes through a component through hole 210. This component through hole 210 has the form of an oblong hole, so that the entire locking fastening device 10 may be displaced radially. In other words, after the locking fastening device 10 has been released, the first component 100 may be moved to the left and the rear or to the right and front in FIG. 4. After the displacement inside the oblong hole and the additional axial adjustment of the first component relative to the second component, it is only necessary to tighten the locking screw 20 in order to set and immobilize the adjusted location and thus the configuration of the first component 100 relative to the second component 200. If adjustable fastening devices 300 are furthermore used in addition to the locking fastening device 10, as will be explained later on, then the radially oriented oblong hole of the component through hole 210 and the axial freedom after loosening the locking screw 200 for the locking sleeve 50 serves to provide the required degrees of freedom for ensuring that in the event of an intended adjustment of the first component 100 relative to the second component 200, for example by means of an adjustable fastening device 300 of various embodiments of the present invention, clamping of the locking fastening device 10 will not take place.

Figure 6:
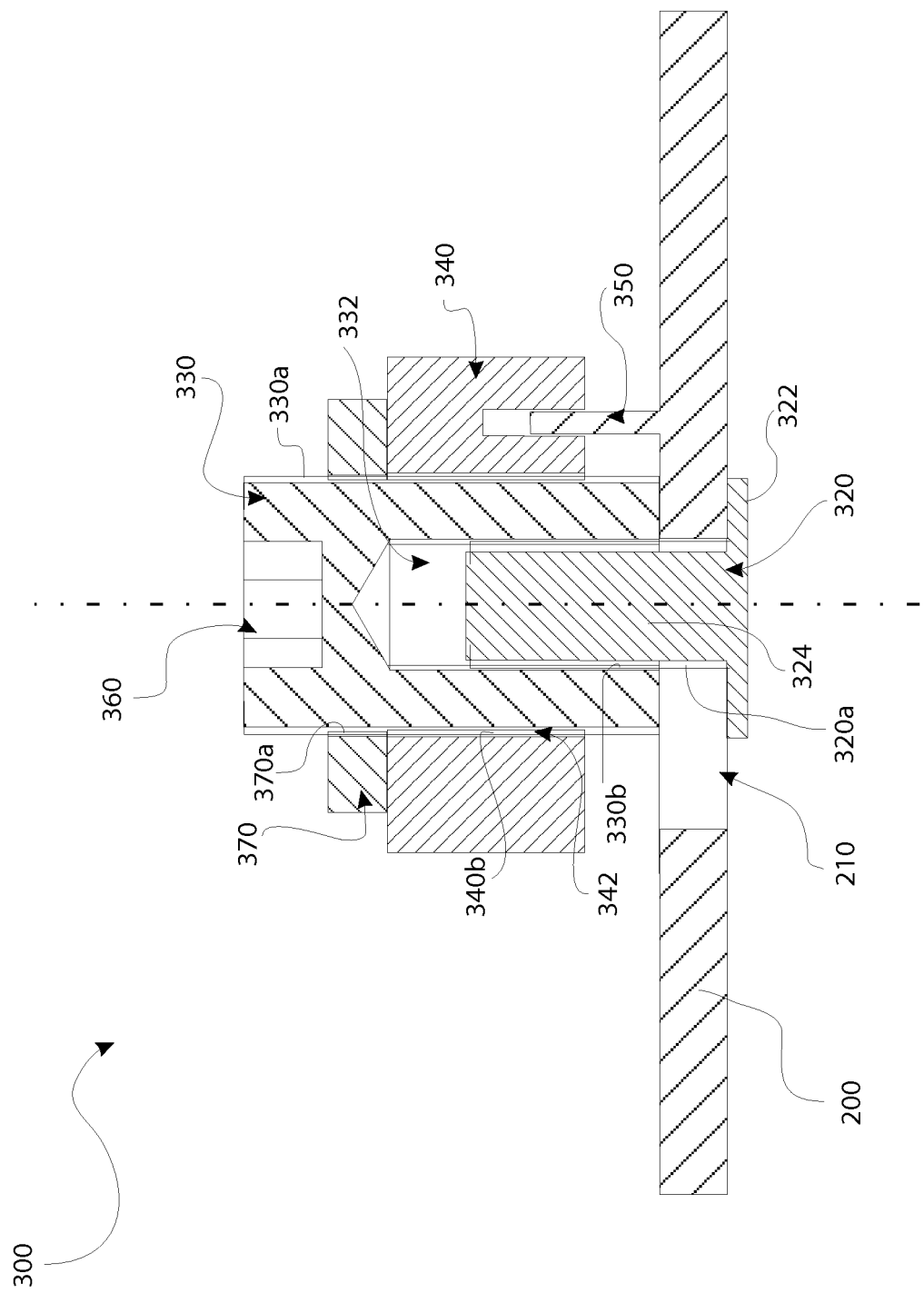
FIG. 6 shows an embodiment of an adjustable fastening device of the invention.

In FIG. 6 a first embodiment of an adjustable fastening device 300 of the invention is represented. This adjustable fastening device 300 allows an intentional axial adjustment of an adjusting sleeve 340 that may be carried out without dedicated tools. To this end a component through hole 210 of the second component is furthermore provided which advantageously is substantially identical with the component through hole 210 as used for the locking fastening device 10. This component through hole 210 is penetrated by the retaining screw barrel 324 of a retaining screw 320, so that the retaining screw head 322 enters into abutment on the bottom side in FIG. 6 of the component 200. FIG. 6 shows the immobilized condition of this embodiment, whereas in FIG. 7 the released condition, i.e. the condition for the adjustment is shown.

At least on portions of the locking screw barrel 324 an external thread 320a is provided on which an adjusting spindle 330 is arranged on the opposite side of the retaining screw head 32 relative to the second component 200. The adjusting spindle 330 comprises an adjusting spindle opening 332 wherein an internal thread 330b is provided on which the external thread 320a of the retaining screw 320 is screwed. In this way, clamping of the entire adjustable fastening device 300 by way of a clamping seat between retaining screw head 322 on the one side of the second component 200 and the adjusting spindle 330 on the other side of the second component 200 is possible.

On the outside of the adjusting spindle 330 an external thread 330a is provided onto which an adjusting sleeve 340 is screwed. To this end the adjusting sleeve 340 comprises an adjusting sleeve opening 342 presenting an internal thread 340b. In addition the adjusting sleeve 340 is countered and thus secured by means of a lock nut 370 and its internal thread 370a. The manner of functioning of the adjustable fastening device of FIGS. 6 and 7 shall be briefly explained in the following.

In order to enable an adjustment, the fastening of the adjustable fastening device 300 should be released. For this purpose the retaining screw 320 is rotated, in particular by a ¼ or ½ turn relative to the adjusting spindle 330, so that the clamping seat on the component through hole 210 is released. The released position is represented, for example, in FIG. 7. In this situation a rotation of the adjusting spindle 330 is possible, with this rotation of the adjusting spindle 330 at the same time representing a rotation of the retaining screw 320. For this rotation an auxiliary adjusting device 360 having the form of a hexagonal socket is provided in the adjusting spindle 330, which may be engaged by a hexagonal socket bit or a hexagon socket screw key to thereby rotate the adjusting spindle 330. Due to the rotation and due to the adjusting sleeve 340 being held fast, an upward or downward movement of the adjusting spindle 340 takes place if the lock nut 370 was previously turned to a position in which the desired adjusting direction is enabled.

Figure 7:
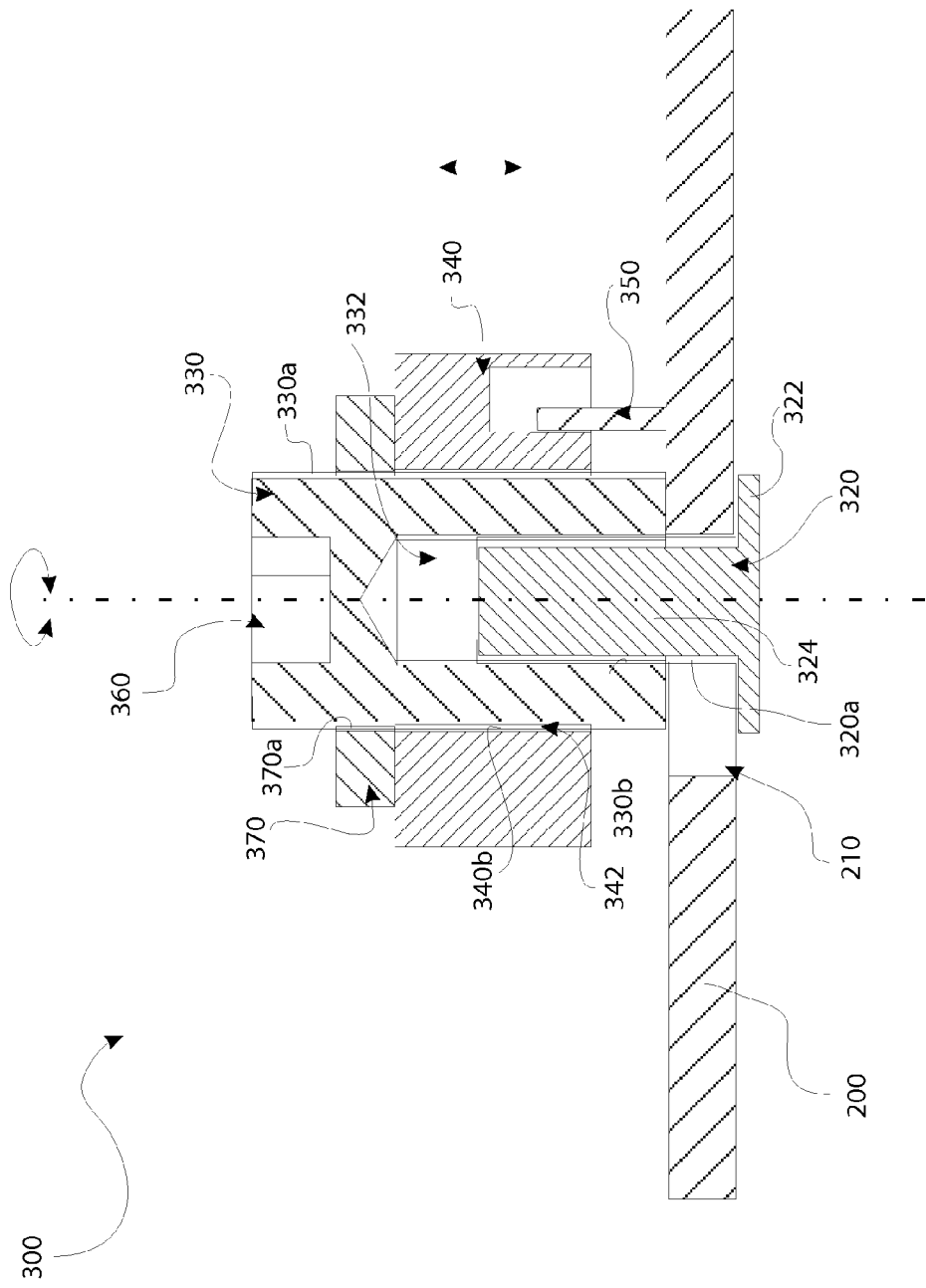
FIG. 7 shows the adjustable fastening device of FIG. 6 in the released condition.

Retaining the adjusting sleeve 340 is here carried out either by hand or with the aid of a securing device 350 as executed in the FIGS. 6 and 7, for example, in the correlation of a nose-type extension of the second component 200 and a depression in the adjusting sleeve 340. In this way the rotation of the adjusting sleeve 340 is blocked, so that the relative rotation may bring about the desired axial movement of the adjusting sleeve 340. In order not to interfere with the axial adjustment, the depression in the adjusting sleeve 340 is configured such that play is present both in an upward and in a downward direction for adjusting the adjusting sleeve 340 in the desired degrees of adjustment.

Figure 9:
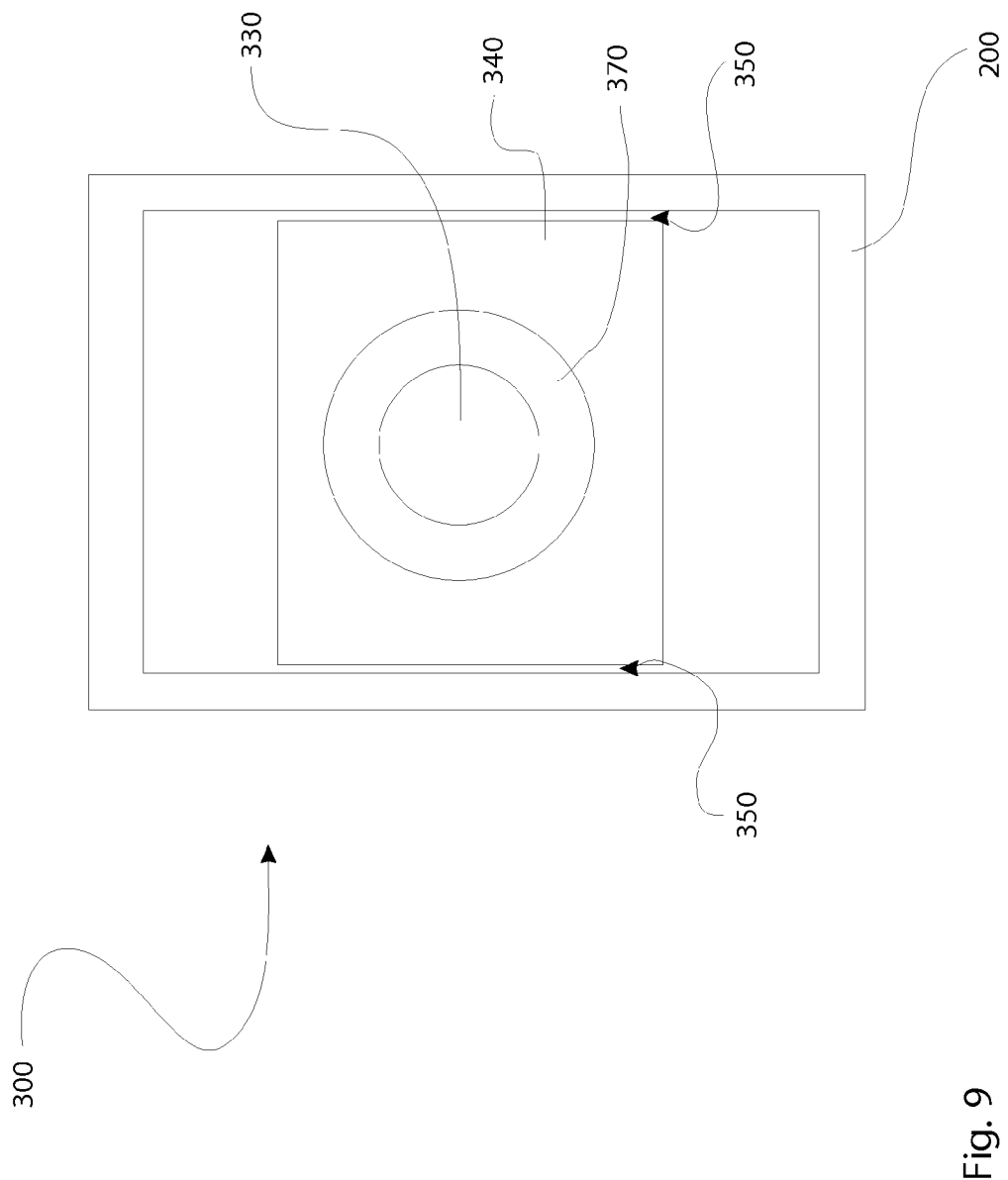
FIG. 9 shows an embodiment of an adjustable fastening device of the invention.

One alternative for the securing device 350 of FIGS. 6 and 7 can be taken, for example, from FIG. 9 where it may be seen that the adjusting sleeve 340 is a non-rotationally symmetrical component. The second component 200 has a depression into which the adjustable fastening device 300 was inserted at least partially. This depression presents geometrical circumstances wherein the non-rotationally symmetrical adjusting sleeve 340 comes to lie, at least in portions thereof, against the outer contour of the depression in the second component 200. These contact points or contact surfaces represent the securing device 350, for in this way the adjusting sleeve 340 is prevented from being driven to rotate by the rotation of the adjusting spindle 330.

Figure 8:
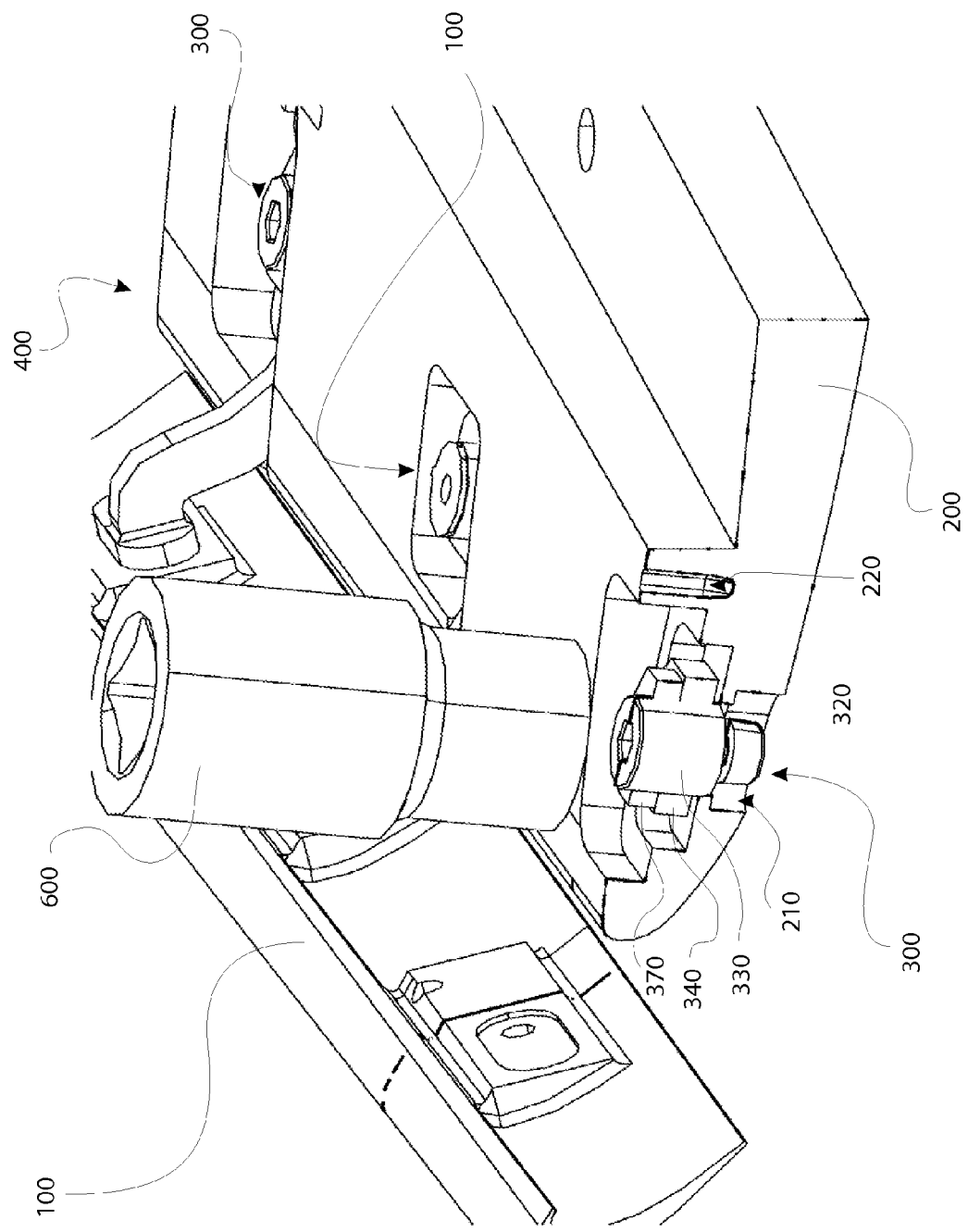
FIG. 8 shows a further embodiment of an adjustable fastening device of the invention.

FIG. 8 shows in an isometric partial sectional view a possible arrangement of an adjustable fastening device 300 of FIG. 6, 7, or 9 in a component system 400. Here it may also be seen that the first component 100 is fastened to the second component 200 via three fastening devices, with the two outer fastening devices being adjustable fastening devices 300, whereas the central fastening device is a locking fastening device 10 of various embodiments of the present invention. In this instance, too, the component through hole 210 is an oblong hole, thereby enabling a radial adjustability of the adjustable fastening device 300 and thus of the first component 100.

In the case of a combination of the adjustable fastening devices 300 with locking fastening devices 10 as shown in FIG. 8 it is advantageous that the adjustment may be effected by means of the adjustable fastening devices 300, whereas a load transfer may take place not only via the adjustable fastening devices 300 but also via the locking fastening devices 10. The adjustment is hereby improved even further in comparison with using locking fastening devices 10 exclusively. In addition, a locking fastening device of various embodiments of the invention 10 provides the desired freedom of movement both axially and radially, to enable an adjustment of the overlap or of the gap of the first component 100 relative to the second component. The adjustment in either direction advantageously takes place with the aid of the adjusting devices 300.

Figure 10:
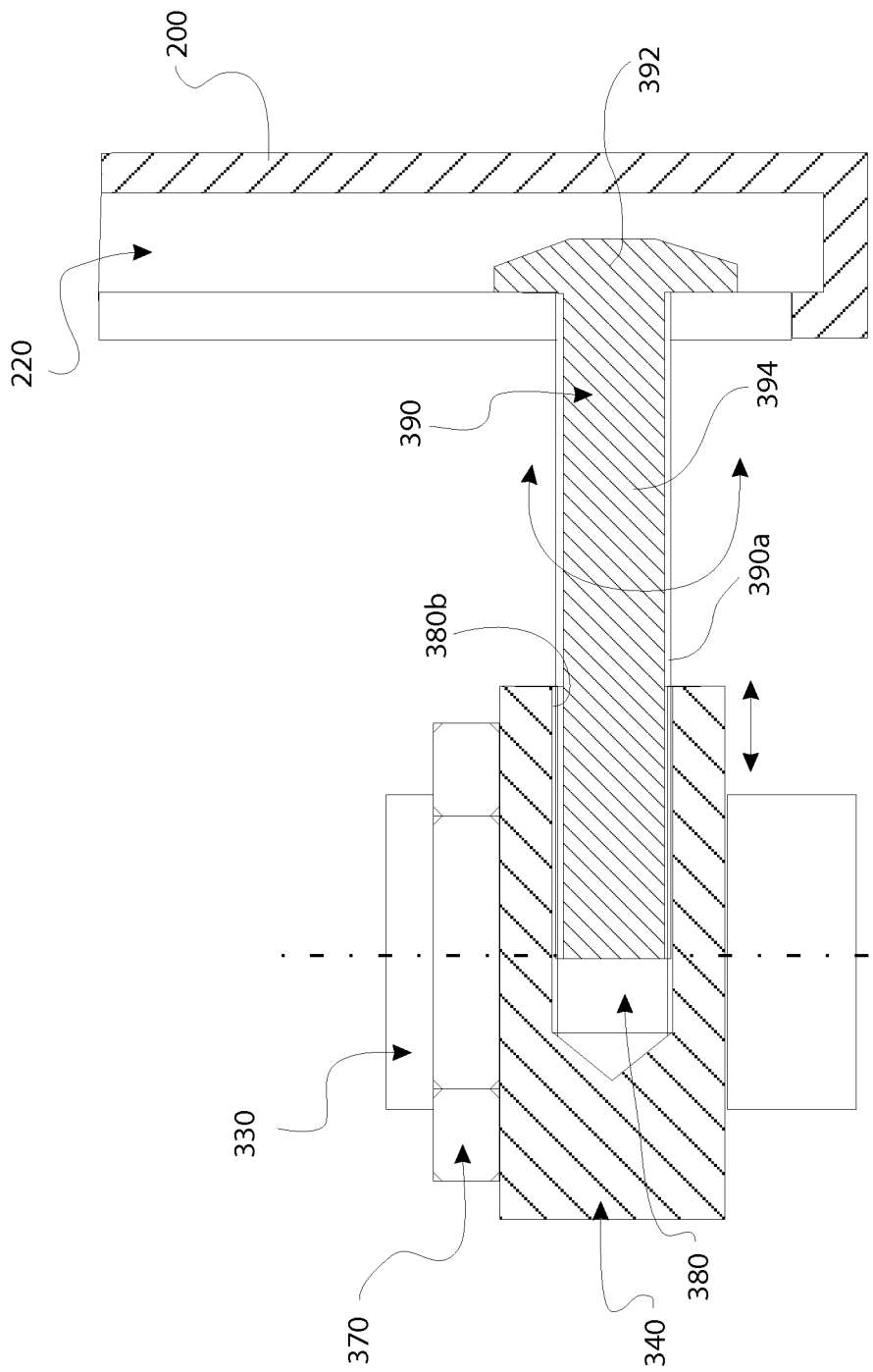
FIG. 10 shows an embodiment of an adjustable fastening device of the invention.

In order to also be able, in the axial adjustment by means of the adjusting device 300 as explained in the foregoing, to carry out a radial adjustment in a particularly simple and accurate manner, an adjustable fastening device 300 in accordance with FIG. 10 may be realized. Here it is also possible for an radial adjusting sleeve opening 380 to be provided in the adjusting sleeve 340, which is engaged by an adjusting screw 390 having an external thread 390a on the adjusting screw barrel 394. The adjusting screw head 392 is guided in a component retaining slit 220 of the second component 200 that has a slit opening presenting a width that is smaller than the outer diameter of the adjusting screw head 392. When the adjusting screw 390 is rotated, the adjusting sleeve 340 lacking the possibility of a relative movement and thus the entire adjustable fastening device 300 moves left or right, which amounts to a radial adjustment of the adjusting sleeve 340 and thus to a radial adjustment of the first component 100 relative to the second component 200.

In such an embodiment, i.e. in a combination of radial adjustability according to FIG. 10 with an axial adjustability of FIGS. 6 to 9, a radial possibility of adjustment additionally acts as a securing device 350 suppressing rotation of the adjusting sleeve 340. Here, too, it may be seen that the component retaining slit 220 and its slit opening are configured such as to admit the possibility of an axial displacement of the adjusting screw 390. This provides the axial adjustment of the adjusting sleeve 340 due to the mechanisms explained in the foregoing as a degree of freedom in this adjusting mechanism. The adjusting screw head 392 of this embodiment is substantially chamfered or has a lens shape, so that in the event of different amounts of radial adjustment across the course of spanwidth, i.e. across various adjustable fastening devices 300, jamming of the respective adjusting screw 390 is prevented. In this way it is possible to adjust additional curvatures in the first component 100 with regard to the second component 200 without incurring unnecessarily high strains to the materials of the fastening devices 10 and 300.

Figure 11:
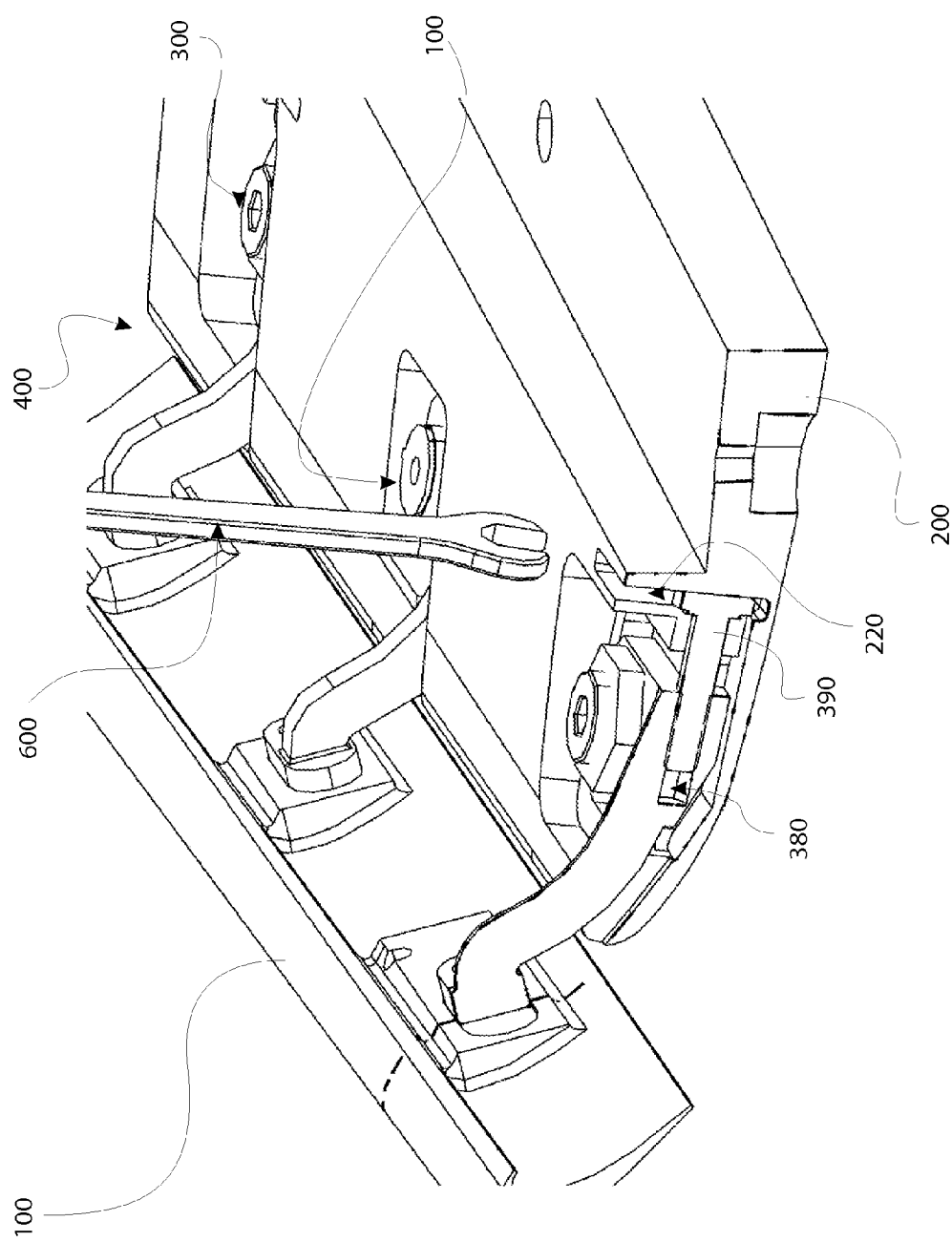
FIG. 11 shows an embodiment of an adjustable fastening device of the invention.

FIG. 11 represents in an isometric partial sectional view the embodiment of FIG. 10, with the correlation between the possibility of radial adjustment of FIG. 10 and the possibility of axial adjustment of FIGS. 6 to 9 being well discernible. Thus, in FIG. 11 the radial adjustment by means of the adjusting screw 390 is situated in front of the axial adjustment by means of the adjusting spindle 330, of which only the adjusting spindle 330 and the lock nut 370 are visible.

Figure 12:
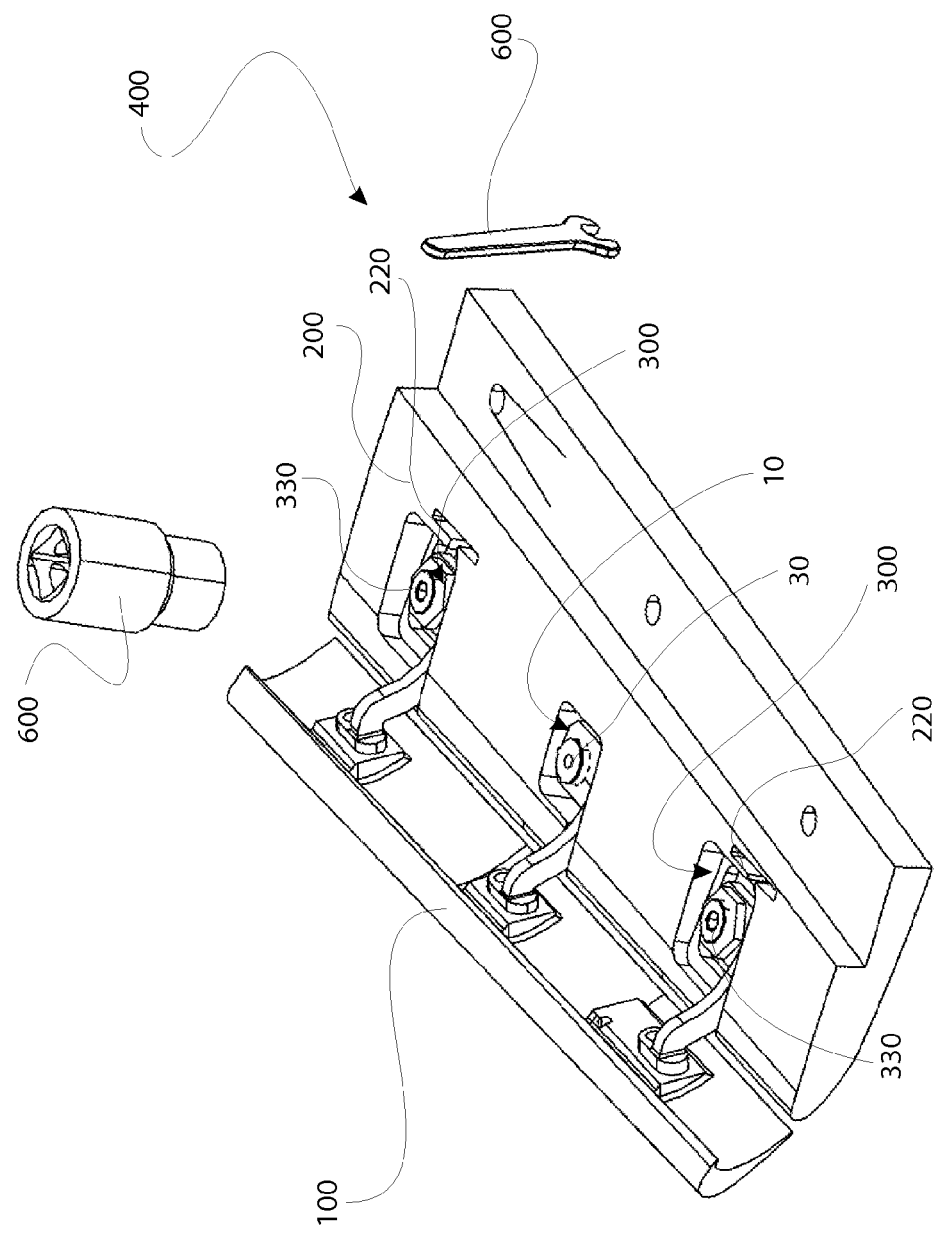
FIG. 12 shows an embodiment of a component system of the invention.
Figure 13:
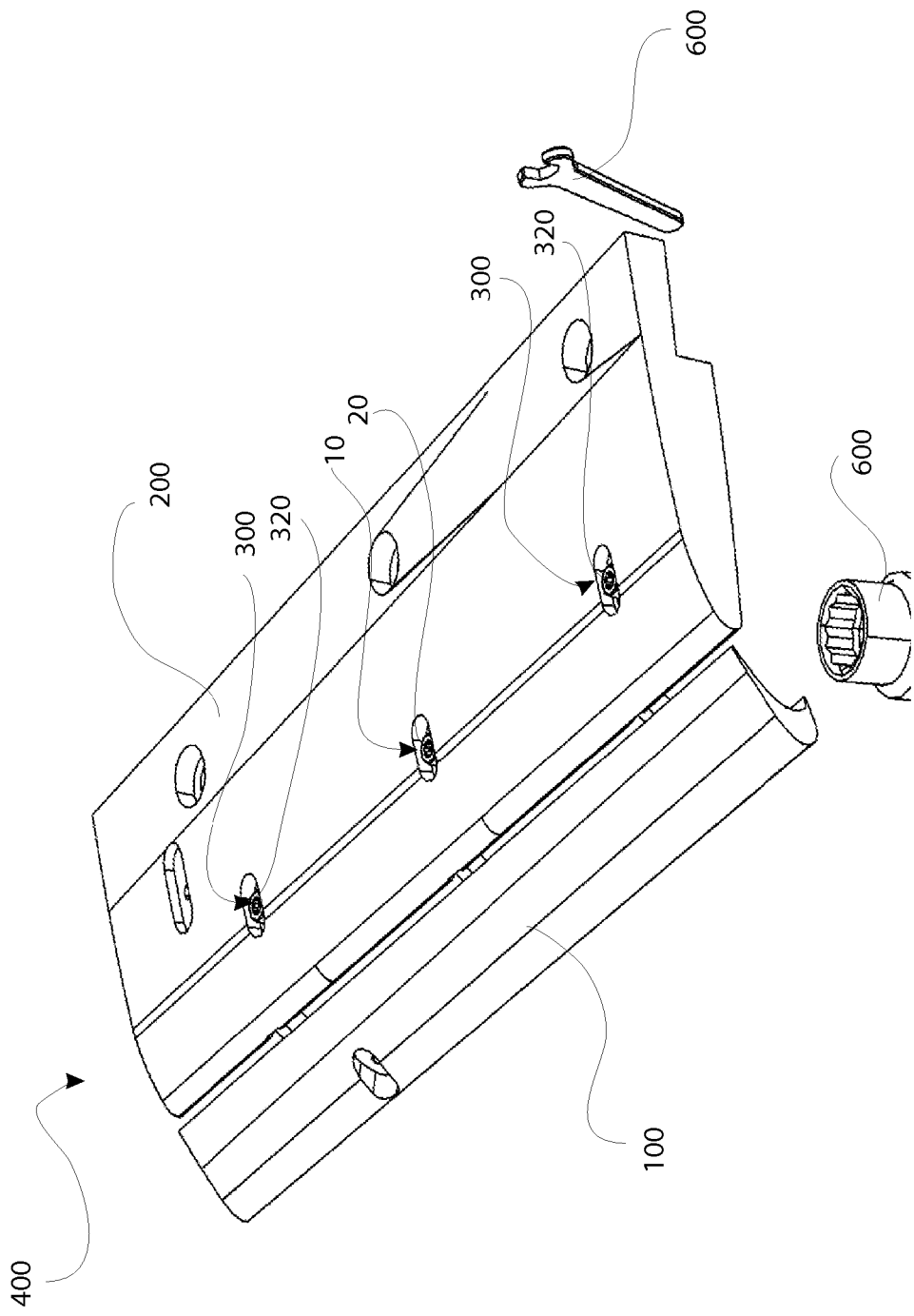
FIG. 13 shows the component system of the FIG. 12 from the top.

FIGS. 12 and 13 represent a component system 400 wherein the fastening devices are realized as adjustable fastening devices 300 and as a locking fastening device 10. The adjustable fastening devices 300 are provided on the two outer ends of the second component while a locking fastening device 10 is present centrally. Via nose-type extensions the respective locking sleeve 50 or adjusting sleeves 340 are advantageously connected integrally to the first component 100.

For relative local immobilization of the first component 100 relative to the second component 200, in a first step the locking fastening device 10 is released. This is done by loosening the locking screw 20, to thus cancel clamping of the clamping sleeve and correspondingly of the locking sleeve 50. The first component 100 is then only locally immobilized by means of the adjustable fastening device 300. These are subsequently also loosened by releasing the retaining screws 320 of the adjustable fastening devices 300. This is done by turning them by a ¼ or ½ turn. Following the release, the adjusting spindles 330 for each adjustable fastening device 300 may be rotated either singly or jointly, so that the adjusting sleeve 340 is adjusted axially by a relative rotation between the adjusting spindle 330 and the adjusting sleeve 340. Due to the connection to the first component 100, the axial adjustment results in an axial displacement and thus in a gap adjustment of the first component 100 relative to the second component 200, i.e. of the high lift body relative to the main wing. Before or after a radial adjustment, i.e. an overlap adjustment, may take place. To this end the adjusting screw 390 of the adjustable fastening devices 300 is rotated so that due to its rotation, the adjusting sleeve 340 of the adjustable fastening device 300 moves radially. In this way the first component 100 furthermore moves away from or toward the second component 200, whereby the overlap may be adjusted. After the adjustment to the desired dimensions of overlap and gap of the first component 100 relative to the second component 200 has been completed, either the locking fastening device 10 is tightened again in the first step, or in a first step the adjustable fastening devices 300 are fastened again. After all fastening devices 10 and 300 have been fastened, a sufficient load transfer is possible, so that the model having the two components 100 and 200 may be used in the adjusted configuration.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

LIST OF REFERENCE SYMBOLS 10 locking fastening device
20 locking screw
20a external thread of the locking screw
22 locking screw head
24 locking screw barrel
30 threaded sleeve
30b internal thread of the threaded sleeve
32 conical lateral surface of the threaded sleeve
34 threaded sleeve through hole
40 clamping sleeve 42 outer clamping sleeve surface
44 clamping sleeve through hole
46a conical inner clamping sleeve surface
46b conical inner clamping sleeve surface
50 locking sleeve
52 inner locking sleeve surface
54 locking sleeve through hole
60 through sleeve
62 conical through sleeve lateral surface
64 through sleeve through hole
100 first component
200 second component
210 component through hole
220 component retaining slit
300 adjustable fastening device
320 retaining screw
320a external thread of the retaining screw
322 retaining screw head
324 retaining screw barrel
330 adjusting spindle
330a external thread of the adjusting spindle
330b internal thread in the adjusting spindle
332 axial adjusting spindle opening
340 adjusting sleeve
340b internal thread in adjusting sleeve
342 adjusting sleeve through hole
350 blocking device
360 auxiliary adjusting device
370 lock nut
370a lock nut internal thread
380 radial adjusting sleeve opening
380b internal thread in the radial adjusting sleeve opening
390 adjusting screw
390a external thread on the adjusting screw
392 adjusting screw head
394 adjusting screw barrel
400 component system
600 tool
GA gap
OL overlap

What is claimed is:

1. A locking fastening device for fastening a first component to a second component, comprising:
    a locking screw having a locking screw head and a locking screw barrel presenting an external thread which is configured to be connected to one of the components,
    at least one threaded sleeve which presents at least one conical lateral surface of the threaded sleeve and one threaded sleeve through hole presenting an internal thread whereby the threaded sleeve is screwed onto the external thread of the locking screw in such a way that the smallest outer diameter of the conical lateral surface of the threaded sleeve points in the direction of the locking screw head,
    at least one clamping sleeve having an outer clamping sleeve surface and a clamping sleeve through hole having at least one conical inner clamping sleeve surface, the conical inclination angle of which corresponds to the conical inclination angle of the conical lateral surface of the threaded sleeve and into which the threaded sleeve is inserted such that the conical lateral surface of the threaded sleeve faces the conical inner clamping sleeve surface, and
    a locking sleeve which is configured to be connected to one of the components and comprises a locking sleeve through hole whose inner locking sleeve surface is arranged opposite from the outer clamping sleeve surface.

2. The locking fastening device according to claim 1, wherein a through sleeve with a through sleeve through hole through which the locking screw barrel extends is arranged between the threaded sleeve and the locking screw head.

3. The locking fastening device according to claim 2, wherein the through sleeve comprises at least one conical through sleeve lateral surface and is arranged such that the smallest diameter of the conical through sleeve lateral surface points in the direction of the smallest diameter of the conical lateral surface of the threaded sleeve, and the clamping sleeve has at least one further conical inner clamping sleeve surface, the conical inclination angle of which corresponds to the conical inclination angle of the conical through sleeve lateral surface and which are facing each other.

4. The locking fastening device according to claim 1, wherein the locking screw barrel is configured to extend through a component through hole of one of the two components such that that locking screw head is arranged on the one side and the threaded sleeve and/or the through sleeve on the other side of this component through hole.

5. The locking fastening device according to claim 4, wherein the outer diameter of the locking screw barrel is smaller than the component through hole.

6. An adjustable fastening device for adjustably fastening a first component to a second component, comprising:
    a retaining screw having a retaining screw head and a retaining screw barrel presenting an external thread, which is configured to be connected to one of the components,
    an adjusting spindle presenting an external thread and having an axial adjusting spindle opening extending along the axis of rotation of the adjusting spindle and presenting an internal thread into which the retaining screw barrel is screwed in such a way that the retaining screw head is configured to be arranged on one side and the adjusting spindle on the other side of a component through hole, and
    an adjusting sleeve which is configured to be connected to one of the components, comprising an adjusting sleeve through hole presenting a internal thread which is screwed onto the external thread of the adjusting spindle.

7. The adjustable fastening device according to claim 6, wherein a blocking device is provided which presents, by means of an at least partial form-fit coupling with at least one portion of the adjusting sleeve, a relative rotation of the adjusting sleeve relative to the adjusting spindle.

8. The adjustable fastening device according to claim 6, wherein the adjusting spindle comprises an auxiliary adjusting device which facilitates a rotation of the adjusting spindle relative to the adjusting sleeve through at least partial form-fit coupling or frictional coupling with a tool.

9. The adjustable fastening device according to claim 6, wherein a lock nut presenting an internal thread is screwed onto the external thread of the adjusting spindle such that the adjusting sleeve is situated between the retaining screw head and the lock nut.

10. The adjustable fastening device according to claim 6, wherein a radial adjusting sleeve opening presenting an internal thread and extending transversely to the axis of rotation of the adjusting spindle is provided in the adjusting sleeve, into which an external thread of an adjusting screw barrel of an adjusting screw is screwed, and the adjusting screw comprises an adjusting screw head which is configured to be arranged in a component retaining slit of one of the two components in such a way that the adjusting screw barrel protrudes from this component retaining slit transversely to the axis of rotation of the adjusting sleeve.

11. A component system comprising at least one first component which is fastened to a second component, the component system comprising:
   at least two fastening devices spaced apart from each other for fastening the first component to the second component, whereby a position of the first component relative to the second component is adjustable by at least one fastening device as an adjustable fastening device,
   at least one component through hole for each fastening device through which a barrel of a screw of the respective fastening device protrudes for connecting the latter to the component, and
   at least one component retaining slit for the adjustable fastening device in which the adjusting screw head of an adjusting screw is arranged,
   wherein at least one of the fastening devices is a locking fastening device comprising:
      a locking screw having a locking screw head and a locking screw barrel presenting an external thread which is configured to be connected to one of the components,
      at least one threaded sleeve which presents at least one conical lateral surface of the threaded sleeve and one threaded sleeve through hole presenting an internal thread whereby the threaded sleeve is screwed onto the external thread of the locking screw in such a way that the smallest outer diameter of the conical lateral surface of the threaded sleeve points in a direction of the locking screw head,
      at least one clamping sleeve having an outer clamping sleeve surface and a clamping sleeve through hole having at least one conical inner clamping sleeve surface, the conical inclination angle of which corresponds to the conical inclination angle of the conical lateral surface of the threaded sleeve and into which the threaded sleeve is inserted such that the conical lateral surface of the threaded sleeve faces the conical inner clamping sleeve surface, and
      a locking sleeve which is configured to be connected to one of the components and comprises a locking sleeve through hole whose inner locking sleeve surface is arranged opposite from the outer clamping sleeve surface.

12. The component system according to claim 11, wherein the first component is a high lift body model, and the second component is a main wing model of an aircraft model.

13. A component system comprising at least one first component which is fastened to a second component, the component system comprising:
   at least two fastening devices spaced apart from each other for fastening the first component to the second component, whereby a position of the first component relative to the second component is adjustable by at least one fastening device as an adjustable fastening device,
   at least one component through hole for each fastening device through which a barrel of a screw of the respective fastening device protrudes for connecting the latter to the component, and
   at least one component retaining slit for the adjustable fastening device in which the adjusting screw head of an adjusting screw is arranged,
   wherein at least one of the fastening devices is an adjustable fastening device comprising:
      a retaining screw having a retaining screw head and a retaining screw barrel presenting an external thread, which is configured to be connected to one of the components,
      an adjusting spindle presenting an external thread and having an axial adjusting spindle opening extending along an axis of rotation of the adjusting spindle and presenting an internal thread into which the retaining screw barrel is screwed in such a way that the retaining screw head is configured to be arranged on one side and the adjusting spindle on the other side of a component through hole, and
      an adjusting sleeve which is configured to be connected to one of the components, comprising an adjusting sleeve through hole presenting a internal thread which is screwed onto the external thread of the adjusting spindle.

14. The component system according to claim 13, wherein the first component is a high lift body model, and the second component is a main wing model of an aircraft model.

15. A main wing of a wind tunnel model aircraft comprising an adjusting device which comprises at least one locking fastening device and at least two adjustable fastening devices for adjusting and fastening an aerodynamic additional body, which is adapted to be adjusted relative to the main wing by means of a plurality of retaining devices, wherein the main wing comprises oblong holes spaced apart from each other in the direction of span of the main wing for receiving a respective adjusting device or a fixing device, and wherein the adjusting device comprises:
   at least two adjustable fastening devices for adjusting the distance of the high lift body relative to the main wing in the direction of depth and the direction of thickness of the main wing, each of which is formed of a pair of a spindle and a retaining screw received in a bore thereof presenting an internal thread and penetrating an oblong hole, which are disposed on opposite sides of the main wing, a fitting that is fastened by means of a retaining device to the aerodynamic additional body and that is in threaded engagement with an external thread of the spindle, as well as a fixing means for immobilizing a rotational position of the spindle relative to the retaining screw, and
   at least one locking fastening device for immobilizing the position of the aerodynamic additional body/high lift body relative to the main wing.

* * * * *